United States Patent
Mohapatra et al.

(10) Patent No.: US 12,554,962 B2
(45) Date of Patent: Feb. 17, 2026

(54) CONFIGURABLE PROCESSOR ELEMENT ARRAYS FOR IMPLEMENTING CONVOLUTIONAL NEURAL NETWORKS

(71) Applicant: Intel Corporation, Santa Clara, CA (US)

(72) Inventors: Debabrata Mohapatra, Santa Clara, CA (US); Arnab Raha, Santa Clara, CA (US); Gautham Chinya, Sunnyvale, CA (US); Huichu Liu, Santa Clara, CA (US); Cormac Brick, San Francisco, CA (US); Lance Hacking, Spanish Fork, UT (US)

(73) Assignee: Intel Corporation, Santa Clara, CA (US)

( * ) Notice: Subject to any disclaimer, the term of this patent is extended or adjusted under 35 U.S.C. 154(b) by 874 days.

(21) Appl. No.: 16/726,709

(22) Filed: Dec. 24, 2019

(65) Prior Publication Data

US 2020/0134417 A1    Apr. 30, 2020

(51) Int. Cl.
*G06N 3/04*  (2023.01)
*G06F 9/30*  (2018.01)
(Continued)

(52) U.S. Cl.
CPC ............ *G06N 3/04* (2013.01); *G06F 9/30036* (2013.01); *G06F 9/30038* (2023.08);
(Continued)

(58) Field of Classification Search
CPC .................................. G06N 3/04; G06N 3/06
See application file for complete search history.

(56) References Cited

U.S. PATENT DOCUMENTS 10,127,494 B1    11/2018  Cantin
2017/0103316 A1   4/2017  Ross
(Continued)

FOREIGN PATENT DOCUMENTS

CN    113033765 A    6/2021
KR  20210082058 A    7/2021
(Continued)

OTHER PUBLICATIONS

Farabet et al., "NeuFlow: A Runtime Reconfigurable Dataflow Processor for Vision," CVPR 2011 Workshops, Colorado Springs, CO, 2011, pp. 109-116.
(Continued)

*Primary Examiner* — Alexey Shmatov
*Assistant Examiner* — Clint Mullinax
(74) *Attorney, Agent, or Firm* — Akona IP PC

(57) ABSTRACT

Example apparatus disclosed herein include an array of processor elements, the array including rows each having a first number of processor elements and columns each having a second number of processor elements. Disclosed example apparatus also include configuration registers to store descriptors to configure the array to implement a layer of a convolutional neural network based on a dataflow schedule corresponding to one of multiple tensor processing templates, ones of the processor elements to be configured based on the descriptors to implement the one of the tensor processing templates to operate on input activation data and filter data associated with the layer of the convolutional neural network to produce output activation data associated with the layer of the convolutional neural network. Disclosed example apparatus further include memory to store the input activation data, the filter data and the output activation data associated with the layer of the convolutional neural network.

25 Claims, 27 Drawing Sheets

(51) Int. Cl.
  G06F 15/80 (2006.01)
  G06F 17/16 (2006.01)
  G06N 3/06 (2006.01)
(52) U.S. Cl.
  CPC .............. G06F 15/80 (2013.01); G06F 17/16 (2013.01); G06N 3/06 (2013.01)

(56) References Cited

U.S. PATENT DOCUMENTS

| | | | | |
|---|---|---|---|---|
| 2018/0121796 | A1* | 5/2018 | Deisher | G10L 15/16 |
| 2019/0114529 | A1* | 4/2019 | Ng | G06N 3/0464 |
| 2019/0286982 | A1* | 9/2019 | Ambai | G06N 3/045 |
| 2019/0294413 | A1 | 9/2019 | Vantrease et al. | |
| 2019/0332925 | A1* | 10/2019 | Modha | G06N 3/04 |
| 2020/0005127 | A1* | 1/2020 | Baum | G06N 3/063 |
| 2020/0134417 | A1 | 4/2020 | Mohapatra et al. | |
| 2020/0193232 | A1* | 6/2020 | Wang | G06F 18/2148 |
| 2020/0410327 | A1 | 12/2020 | Chinya et al. | |

FOREIGN PATENT DOCUMENTS

| | | | |
|---|---|---|---|
| TW | 201706871 | A | 2/2017 |
| TW | 201911139 | A | 3/2019 |
| TW | 202127324 | A | 7/2021 |

OTHER PUBLICATIONS

Shafiee et al., "ISAAC: A convolutional neural network accelerator with in-situ analog arithmetic in crossbars," In Proceedings of the 43rd International Symposium on Computer Architecture (ISCA '16), IEEE Press, Piscataway, NJ, USA, Oct. 5, 2016, 14-26, DOI: https://doi.org/10.1109/ISCA.2016.1.

Du et al., "ShiDianNao: Shifting vision processing closer to the sensor," In Proceedings of the 42nd Annual International Symposium on Computer Architecture (ISCA '15), ACM, New York, NY, USA, 2015, 92-104, DOI: https://doi.org/10.1145/2749469.2750389.

Intel, "Industry-Proven Computer Vision and AI Intel® Movidius™ Myriad™ VPU 2: A Class-Defining Processor", Retrieved on Jun. 13, 2022 from https://www.intel.com/content/www/us/en/products/details/processors/movidius-vpu.html.

Jouppi et al., "In-datacenter performance analysis of a tensor processing unit," ISCA, Toronto, ON, Canada, Jun. 24-28, 2017, pp. 1-12.

Chen et al., "Eyeriss: An Energy-Efficient Reconfigurable Accelerator for Deep Convolutional Neural Networks," in ISSCC 2016, IEEE International Solid-State Circuits Conference, Jan. 31-Feb. 4, 2016, San Francisco, CA.

Chetlur et al., "cuDNN : Efficient Primitives for Deep Learning," arXiv:1410.0759v3 [cs.NE] Dec. 18, 2014.

Moreau et al., "A Hardware-Software Blueprint for Flexible Deep Learning Specialization," arXiv:1807.04188v3 [cs.LG] Apr. 23, 2019.

Fowers et al., "A configurable cloud-scale DNN processor for real-time AI," ISCA 2018.

Li Jiajun et al, "SmartShuttle: Optimizing off-chip memory accesses for deep learning accelerators", 2018 Design, Automation & Test in Europe Conference & Exhibition (Date), EDAA, DOI: 10.23919/DATE.2018.8342033 (Publication Date: Mar. 19, 2018).

Intellectual Property Office of India, "Examination report under sections 12 & 13 of the Patents Act, 1970 and the Patents Rules, 2003," issued in connection with Indian Patent Application No. 202044041613 , dated Jun. 16, 2022, 5 Pages.

Taiwan Intellectual Property Office, "Notice of Supplement and Correction of Application," issued in connection with Taiwanese Patent Application No. 109132923, dated Nov. 3, 2020, 5 Pages. English translation provided.

Taiwan Intellectual Property Office, "Notice of Supplement and Correction of Application," issued in connection with Taiwanese Patent Application No. 109132923, dated Oct. 5, 2020, 6 Pages. English translation provided.

Tu Fengbin et al, "Deep Convolutional Neural Network Architecture With Reconfigurable Computation Patterns", IEEE Transactions On Very Large Scale Integration (VLSI) Systems, IEEE Service Center, Piscataway, NJ, USA, vol. 25, No. 8, DOI: 10.1109/TVLSI.2017.2688340 (Publication Date: Jan. 8, 2017).

Taiwan Intellectual Property Office, "Notice of Preliminary Review Opinion and Search Report," issued in connection with Taiwanese Patent Application No. 109132923, dated Feb. 20, 2024, 29 pages. [Full English Translation Included].

Taiwan Intellectual Property Office, "Notice of Preliminary Review Opinion and Search Report," issued in connection with Taiwanese Patent Application No. 109132923, dated Feb. 20, 2024, 32 pages. [English Machine Translation Included].

Yin et al., "A High Energy Efficient Reconfigurable Hybrid Neural Network Processor for Deep Learning Applications," IEEE Journal of Solid-State Circuits, vol. 53, No. 4, Apr. 2018, Retrieved from https://faculty.sist.shanghaitech.edu.cn/faculty/zhoupq/Teaching/Fall18/Guest-Lecture/Thinker-JSSC2018.pdf on Feb. 29, 2024.

\* cited by examiner

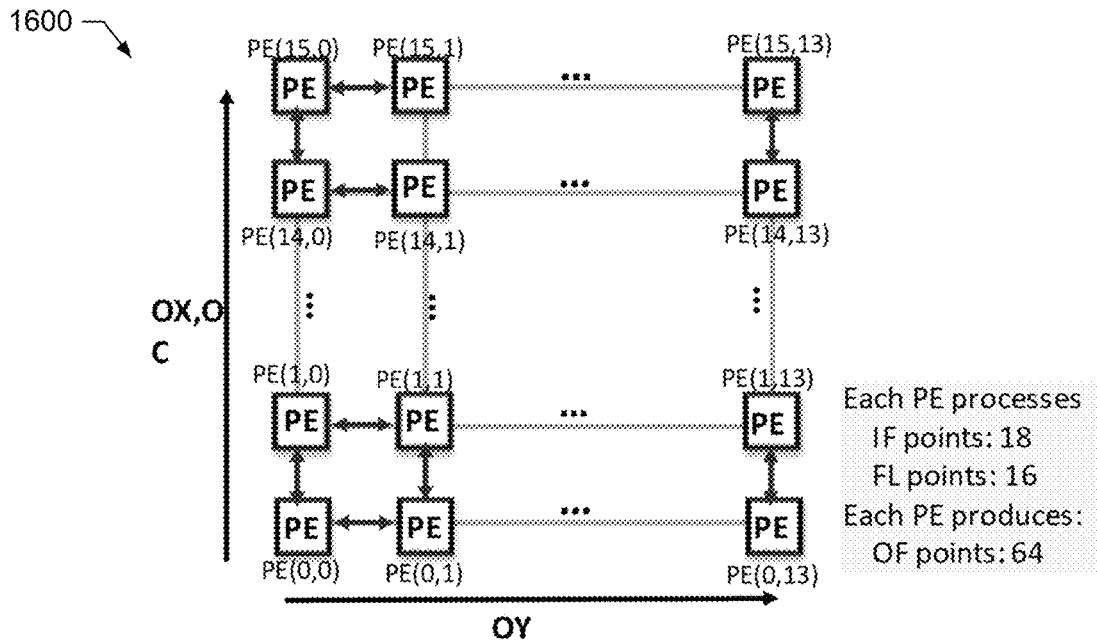

Schedule:
PE level parallelism: [Ox/1/8, Oy/4/14, Oc/16/2]
Outer loop: [Fx/3/1, Fy/3/1, Ic/64/1, Ox/7/1, Oc/2/1]

Pseudo code for loop order/blocking/partition:
for n in batch $O_N$
  for k in ofmap ($O_C$ / 32) = 2
    for x in ofmap_width ($O_X$ / 8) = 7
      for c in ifmap $I_C$ = 64
        for fx in filter_width $F_X$ = 3
          for fy in filter_height $F_Y$ = 3

Parallel_execution (14x16 PEs):
{
In one PE(row = i, col = j): {
  for k in ofmap (Oc/2) = 16,
  for y in ifmap_height ($I_y$/14) = 4
  for x in ifmap_width ($I_x$/8) = 1:
    Psum[n][x][y][k](i,j) += IF[n][x][y][c] * FL[n][c][k];
}
When c = 64: {
    OF[n][x][y][k](i,j) = Psum[n][x][y][k](i,j)
}

1910
1905

Scalar-Vector

FIG. 19

Schedule 1 : Resnet101_scale2a_branch1
IF : 56x56x64, FL: 1x1x64x256, OF: 56x56x256
PE level parallelism : [Ox/1/8, Oy/2/14, Ic/32/2]
Outer loop : [Oc/256/1, Ox/7/1, Oy/2/1]

Vector-Vector

| IF_RF | FL_RF | OF_RF | PE Config Register Values |
|---|---|---|---|
| Ix,Ic,Iy 1x32x2 | Fx,Fy,Ic 1x1x32 | Ox,Oy 1x2 | |
| 0 | 0 | 0 | StAddr<IF/FL/OF>RF = [0, 0, 0] |
| 1 | 1 | 1 | LenAddr<IF/FL/OF>RF = [32, 32, 1] |
| 2 | 2 | | Reset2Start<IF/FL/OF> = [False, True, False] |
| 3 | -- | | IncCyc<IF/FL/OF>RF = [1, 1, 32] |
| -- | -- | | BlocksPERF = 2 |
| -- | -- | | NumPEComp = 64 |
| 30 | 30 | | PEColActv = 16'h3FFF |
| 31 | 31 | | PERowActv = 16'hFFFF |
| 32 | | | TotalWr<IF/FL/OF>RF = [64, 32, 2] |
| 33 | | | IcPF = 2 |
| 34 | | | IcMapDirX = False |
| 35 | | | IcMapDirY = True |
| -- | | | OpPEColActv = 16'h3FFF |
| 62 | | | OpPERowActv = 16'hAAAA |
| 63 | | | |

| 2 sub-compute blocks within 64 cycle computation |
|---|
| IF_addr: [0,1,2,3 .... 31] [32,33, 34, ....., 62, 63] |
| FL_addr: [0,1,2,3 .... 31] [0,1,2,3 .... 31] |
| OF_addr: [0,0,0,0 ..... 0] [1,1,1,1, ...... 1,1] |

FIG. 22

Schedule 2 : Resnet101_scale3a_branch2c
IF: 28x28x128, FL: 1x1x128x512, OF: 28x28x512
PE level parallelism : [Oc/8/16, Ic/8/16]
Outer Loop : [Ox/28/1, Oy/28/1, Oc/4/1]

| IF_RF | FL_RF | OF_RF | PE Config Register Values |
|---|---|---|---|
| Ix,Iy,Ic<br>1x1x8 | Fx,Fy,Ic,Oc<br>1x1x8x8 | Ox,Oy,Oc<br>1x1x8 | |
| 0 | 0 | 0, Oc=0 | StAddr<IF/FL/OF>RF = [0, 0, 0] |
| 1 | 1 | 0, Oc=1 | LenAddr<IF/FL/OF>RF = [8, 8, 1] |
| 2 | -- | 0, Oc=2 | Reset2Start<IF/FL/OF> = [True, False, False] |
| 3 | 7 | 0, Oc=3 | IncCyc<IF/FL/OF>RF = [1, 1, 8] |
| 4 | 0 | 0, Oc=4 | BlocksPERF = 8 |
| 5 | 1 | 0, Oc=5 | NumPEComp = 64 |
| 6 | -- | 0, Oc=6 | PEColActv = 16'hFFFF |
| 7 | 7 | 0, Oc=7 | PERowActv = 16'hFFFF |
| | 0 | | TotalWr<IF/FL/OF>RF = [8, 64, 8] |
| | 1 | | IcPF = 16 |
| | -- | | IcMapDirX = True |
| | 7 | | IcMapDirY = False |
| | | | OpPEColActv = 16'h8000 |
| | | | OpPERowActv = 16'hFFFF |

8 sub-compute blocks within 64 cycle computation

IF_addr: [0,1,2,3, ...7] [0,1,2,3, ...7] [0,1,2,3, ...7] ...

FL_addr: [0,1,2,3, ...7] [8,9,10,...15] ..... [56,57,58....63]

OF_addr: [0,0,0,0...0] [1,1,1,1, ...1] ..... [7,7,7,7.....7]

Vector-Matrix

FIG. 23

Schedule 3: Resnet101_scale5a_branch2c
IF: 7x7x512, FL: 1x1x512x2048, OF: 7x7x2048
PE level parallelism : [Ox/1/7, Oy/7/1, Oc/8/16, Ic/8/2]
Outer Loop : [Ic/32/1, Oc/16/1]

*Matrix-Matrix*

| IF_RF | FL_RF | OF_RF | PE Config Register Values |
|---|---|---|---|
| Ix,Iy,Ic<br>1x7x8 | Fx,Fy,Ic,Oc<br>1x1x8x8 | Ox,Oy,Oc<br>1x7x8 | NBlk = [0,1,2,3,4,5,6,7] |
| 0 | 0 | 0 | StAddr<IF/FL/OF>RF = [0, 8*NBlk, 7*NBlk] |
| 1 | -- | 1 | LenAddr<IF/FL/OF>RF = [8, 8, 1] |
| -- | 7 | -- | Reset2Start<IF/FL/OF> = [False, True, False] |
| 7 | 0 | 6 | IncCyc<IF/FL/OF>RF = [1, 1, 8] |
| 0 | -- | 0 | BlocksPERF = 7*8 = 56 |
| 1 | 7 | 1 | NumPEComp = 56 |
| -- | 0 | -- | PEColActv = 16'h3FFF |
| 7 | 1 | 6 | PERowActv = 16'hFFFF |
| 0 | -- | 0 | TotalWr<IF/FL/OF>RF = [56, 64, 56] |
| 1 | 7 | -- | IcPF = 2 |
| -- | -- | 6 | IcMapDirX = True |
| 7 | -- | -- | IcMapDirY = False |
| 0 | 0 | 0 | OpPEColActv = 16'h2AAA |
| -- | -- | -- | OpPERowActv = 16'hFFFF |
| 7 | 7 | 6 | |

| 7 sub-compute blocks within 56 cycle computation |
|---|
| IF_addr: [0,1,2,..7] [8,9,10,..15] [16,17,18,...23]...[48,49,..55] |
| FL_addr: 8*NBlk + [0,1,2,..7] (for each of 7 blocks for 8 rnd) |
| OF_addr: [0,1,2,..6] [7,8,9,..13] ....... [49,50,..,55] |

FIG. 24

Schedule 4: Resnet101_res2a_branch2b
IF: 56x56x64, FL: 3x3x64x64, OF: 56x56x64
PE level parallelism : [Ox/1/8, Oy/4/14, Oc/16/2]
Outer loop : [Fx/3/1, Fy/3/1, Ic/64/1, Ox/7/1, Oc/2/1]

| IF_RF | FL_RF | OF_RF | PE Config Register Values |
|---|---|---|---|
| Iy,Ix 6x3 | Oc 16 | Ox,Oy,Oc 1x4x16 | |
| 0 | 0, Oc=0 | 0 | StAddr<IF/FL/OF>RF = [0, 0, 0] |
| 1 | 0, Oc=1 | 1 | LenAddr<IF/FL/OF>RF = [4, 1, 4] |
| 2 | 0, Oc=2 | 2 | Reset2Start<IF/FL/OF> = [True, False, False] |
| 3 | -- | 3 | IncCyc<IF/FL/OF>RF = [1, 4, 1] |
| 4 | -- | 4 | BlocksPERF = 16 |
| 5 | -- | 5 | NumPEComp = 64 |
| 6 | 0, Oc=14 | 6 | PEColActv = 16'h3FFF |
| 7 | 0, Oc=15 | 7 | PERowActv = 16'hFFFF |
| 8 | | 8 | TotalWr<IF/FL/OF>RF = [18, 16, 64] |
| 9 | | 9 | IcPF = 1 |
| 10 | | 10 | IcMapDirX = False |
| 11 | | 11 | IcMapDirY = False |
| -- | | -- | OpPEColActv = 16'h3FFF |
| 16 | | -- | OpPERowActv = 16'hFFFF |
| 17 | 63 | | |

16 sub-compute blocks within 64 cycle computation

IF_addr: [0,1,2,3] [0,1,2,3] [0,1,2,3] ..... [0,1,2,3]

FL_addr: [0,0,0,0] [1,1,1,1] [2,2,2,2] .... [15,15,15,15]

OF_addr: [0,1,2,3] [4,5,6,7] [8,9,10,11] ....... [60,61,62,63]

Scalar-Vector

FIG. 25

CONFIGURABLE PROCESSOR ELEMENT ARRAYS FOR IMPLEMENTING CONVOLUTIONAL NEURAL NETWORKS

FIELD OF THE DISCLOSURE

This disclosure relates generally to neural networks and, more particularly, to configurable processor element arrays for implementing convolutional neural networks.

BACKGROUND

Neural networks have and continue to be adopted as the underlying technical solutions in a wide range of technical fields, such as facial recognition, speech recognition, navigation, market research, etc., to name a few. As such, the field of neural networking has and continues to grow rapidly, both in terms of inference algorithm development, as well as hardware platform development to implement the evolving inference algorithms. The network layers of neural networks, such as deep learning convolutional neural networks, come in many possible tensor shapes, the dimensions of which continue to change as existing neural network inference algorithms are revised and/or new neural network inference algorithms are developed.

BRIEF DESCRIPTION OF THE DRAWINGS

FIGS. 16-19 illustrate four example dataflow schedules implemented by the configurable processor element array of FIG. 1 when configured according to four corresponding example tensor processing templates.

FIGS. 22-25 illustrate example sets of configuration register descriptor values to be used to configure the configurable processor element array of FIG. 1 to implement the corresponding example dataflow schedules of FIGS. 16-19.

The figures are not to scale. In general, the same reference numbers will be used throughout the drawing(s) and accompanying written description to refer to the same or like parts, elements, etc.

Figure 1:
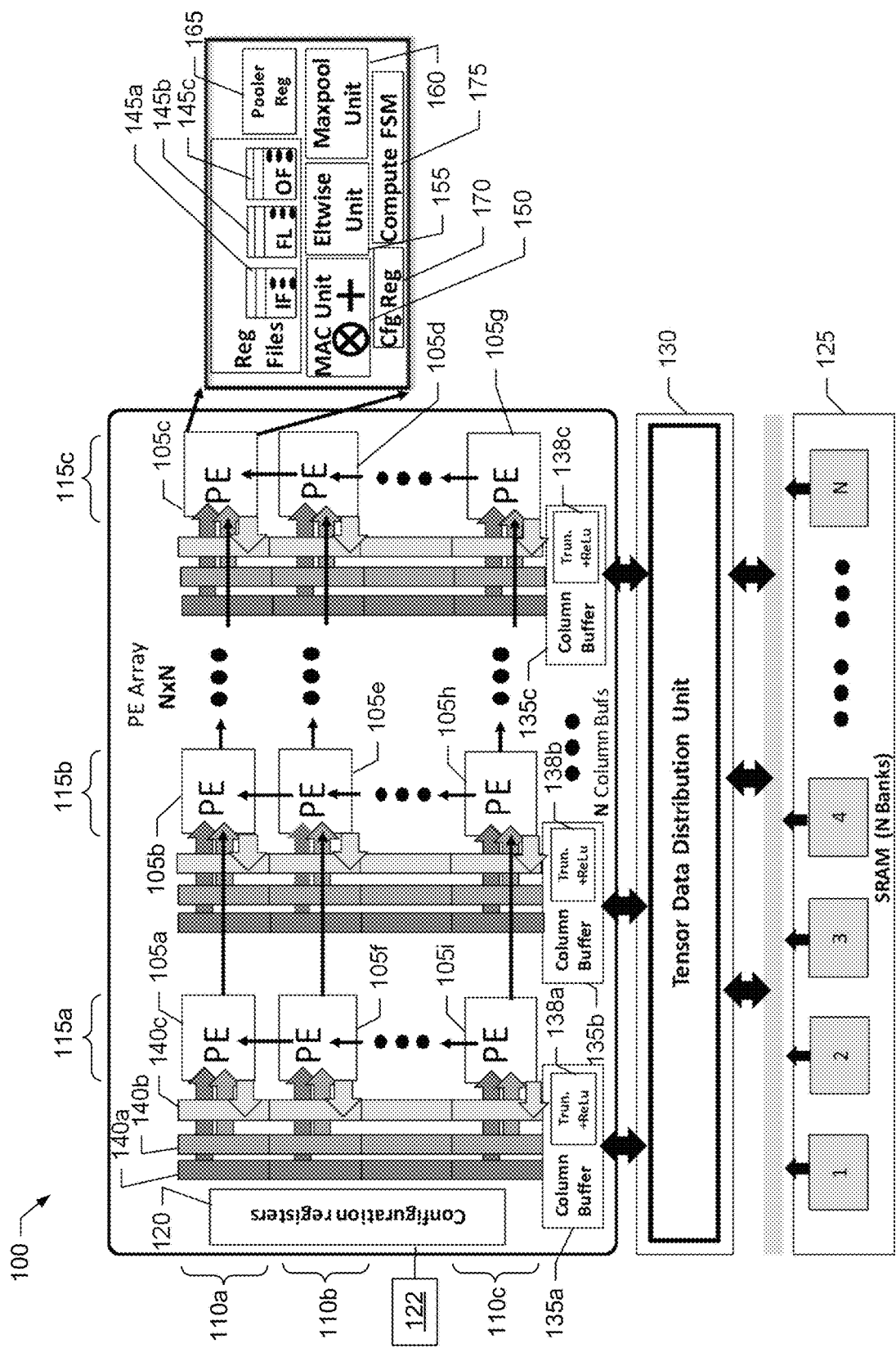
FIG. 1 is a block diagram of an example configurable processor element array for implementing convolutional neural networks in accordance with teachings of this disclosure.

Descriptors "first," "second," "third," etc., are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Example configurable processor element arrays for implementing convolutional neural networks are disclosed herein. As mentioned above, the field of neural networking has and continues to grow rapidly, both in terms of inference algorithm development, as well as hardware platform development to implement the evolving inference algorithms. The network layers of neural networks, such as deep learning convolutional neural networks, come in many possible tensor shapes, the dimensions of which continue to change as existing neural network inference algorithms are revised and/or new neural network inference algorithms are developed. To accommodate the fast-paced evolution of neural networks, the hardware platforms used to implement the neural networks need to be configurable to support the changing dimensions of the network layer tensor shapes. Prior neural network platforms employ field programmable gate arrays (FPGAs) to provide such configurability rather than employing an application specific integrated circuit (ASIC) because reconfiguration of the network layer tensor shapes in an ASIC implementation may require replacing the ASIC, and ASIC design cycles can be long. Thus, by the time an ASIC-based solution for a particular deep learning inference algorithm makes it to the market, the inference algorithms may already have evolved, thereby making the ASIC-based solution outdated. However, FPGAs lack the processing performance and energy efficiency of ASICs.

In contrast with such prior neural network hardware platforms, example configurable processor element arrays disclosed herein provide configurability similar to FPGAs while retaining the energy efficiency of ASICs. Disclosed example configurable processor element arrays enable configuration of different tensor shape computations at runtime, which can accommodate the rapidly evolving field of neural network algorithms having network layers with widely varying tensor dimensions while retaining the performance and energy efficiency provided by an ASIC.

Disclosed example configurable processor element arrays are based on arrays of software configurable processor elements (PEs), also referred to herein as processing elements or primitive kernel modules, which can perform convolution computations on flexible shapes of tensor data, such as filter weights, input activations and/or output activations, to implement a given layer of the neural network. As disclosed in further detail below, the micro-architecture of an example PE included in a configurable processor element array is reconfigurable at runtime (e.g., based on software programmable configuration registers) to implement successive layers of a given neural network, or to implement other neural networks. In some examples, the PE leverages activation and weight reuse for energy efficiency by locating some distributed local storage close to the computation units included in the PE itself.

As disclosed in further detail below, the flexibility of a disclosed example PE to support variable tensor shape computations in hardware is based on the decomposition of the tensor computations associated with a given layer of the neural network into one of a set of possible tensor processing templates. Examples of such tensor processing templates include, but are not limited to, vector-vector, vector-matrix and matrix-matrix tensor processing templates. As disclosed in further detail below, example PEs are controlled based on a set of configuration descriptors to support a particular tensor computation in hardware, with the set of configuration descriptors being initialized at the beginning of execution of the given layer of the neural network. As such, example PEs disclosed herein can be implemented as a purely hardware solution (e.g., via an ASIC), but which exposes hardware configuration registers to software, which enables the software to configure the tensor dataflow for a given network layer during runtime. Thus, example PEs disclosed herein, and the associated arrangement of the PEs into example configurable processor element arrays disclosed herein, enable the flexible dataflows of convolutional neural network layers to execute in hardware accelerators without performance penalty due to, for example, having to offload any work to an external processor or software.

Example configurable processor element arrays disclosed herein provide many benefits over prior hardware platforms for implementing convolutional neural networks. For example, configurable processor element arrays can be implemented with ASICs rather than FPGAs and, thus, exhibit improved performance and power consumption relative to prior platforms. The energy-efficient nature of example configurable processor element arrays disclosed herein can enable further use of machine learning accelerators in a wide range of applications, such as facial recognition, speech recognition, navigation, market research, etc. The energy efficient nature of example configurable processor element arrays disclosed herein can also enable adoption of machine learning accelerators in applications, such as Internet of Things (IoT) applications, drone (e.g., unmanned vehicle) applications, etc., that have been unable to take advantage of machine learning techniques due to the relatively high power consumption exhibited by prior neural network hardware platforms.

Turning to the figures, a block diagram of an example configurable processor element array 100 for implementing convolutional neural networks in accordance with teachings of this disclosure is illustrated in FIG. 1. The example configurable processor element array 100 of FIG. 1 includes example PEs 105a-i arranged in an array including example rows 110a-c and example columns 115a-c, with respective ones of the rows 110a-c having a first number of PEs and respective ones of the columns 115a-c having a second number of PEs. The first number of PEs in the rows 110a-c and the second number of PEs in the columns 115a-c may be the same or different. In the illustrated example, the first number of PEs in the rows 110 a-c and the second number of PEs in the columns 115a-c are the same and labeled as "N" in FIG. 1. For example, N may be 16 or some other value.

The example configurable processor element array 100 of FIG. 1 also includes example configuration registers 120, which may be implemented by, for example, one or more hardware registers, arrays, memories, data cells, etc., or any combination(s) thereof. The configuration registers 120 configure the array of PEs 105a-i to implement a given layer of an example convolutional neural network based on a dataflow schedule. In the illustrated example, the dataflow schedule corresponds to one of a set of possible tensor processing templates supported by the PEs 105a-i. As disclosed in further detail below, the configuration registers 120 accept a set of descriptors that configure ones of the PEs 105a-i to implement one of the possible tensor processing templates to operate on input activation data and filter data associated with the given layer of the convolutional neural network to produce output activation data associated with the given layer of the convolutional neural network. As disclosed in further detail below, the configuration registers 120 can accept a new set of descriptors to reconfigure the array of PEs 105a-i to implement a subsequent layer of the convolutional neural network. For example, the new set of descriptors can be the same as the prior set of descriptors applied to the configuration registers 120. By keeping the descriptors the same in such examples, the ones of the PEs 105a-i can be configured to implement the same tensor processing template as for the prior neural network layer. In other examples, the new set of descriptors can be different from the prior set of descriptors applied to the configuration registers 120. By using different descriptors in such examples, the ones of the PEs 105a-i can be configured to implement another one of the possible tensor processing templates to operate on input activation data and filter data associated with the subsequent layer of the convolutional neural network to produce output activation data associated with the subsequent layer of the convolutional neural network. As such, the configuration registers 120 are an example of means for configuring the array of PEs 105a-i based on a plurality of descriptors to implement a layer of the convolutional neural network based on a dataflow schedule corresponding to one of a plurality of tensor processing templates. Also, the PEs 105a-i are examples of means for operating, based on a tensor processing template, on input activation data and filter data associated with a layer of the convolutional neural network to produce output activation data associated with the layer of the convolutional neural network.

The illustrated example of FIG. 1 includes an example configuration loader 122 to load the set of descriptors into the configuration registers 120. In some examples, the configuration loader 122 includes a compiler to convert a description of a layer of convolutional neural network, which is to be implemented by the configurable processor element array 100, into a dataflow schedule corresponding to a selected one of a set of possible tensor processing templates. The compiler in such examples can utilize one or more criteria, such as, but not limited to, execution time, memory usage, number of PEs to be activated, etc., to select the tensor processing template to be used to construct the dataflow schedule. Furthermore, the compiler in such examples can then convert the resulting dataflow schedule into the set of descriptors to be written into the configuration registers 120. In some examples, the configuration loader 122 is implemented by one or more processors, such as the example processor 2712 shown in the example processor platform 2700 discussed below in connection with FIG. 27. As such, the configuration loader 122 is an example of means for determining and/or writing/loading descriptors into the configuration registers 120.

The example configurable processor element array 100 of FIG. 1 further includes example memory 125 to store the input activation data, the filter data and the output activation data associated with a given layer of the convolutional neural network being implemented by the PEs 105a-i. In the illustrated example, the memory 125 is implemented by banks of static random access memory (SRAM). However, in other examples, other numbers and/or types of memory, and/or combination(s) thereof, may be used to implement the memory 125. As such, the memory 125 is an example of means for storing the input activation data, the filter data and the output activation data associated with the layer of the convolutional neural network.

The example configurable processor element array 100 of FIG. 1 also includes an example tensor data distribution unit 130 to read data from the memory 125 and write the data to the PEs 105a-i. The tensor data distribution unit 130 also accepts data from the PEs 105a-i and stores the data in the memory 125, based on the tensor processing template configured by the set of descriptors for the given neural network layer to be implemented by the PEs 105a-i. An example implementation of the tensor data distribution unit 130 is described in U.S. patent application Ser. No. 16/456,707, filed on Jun. 28, 2019.

Figure 2:
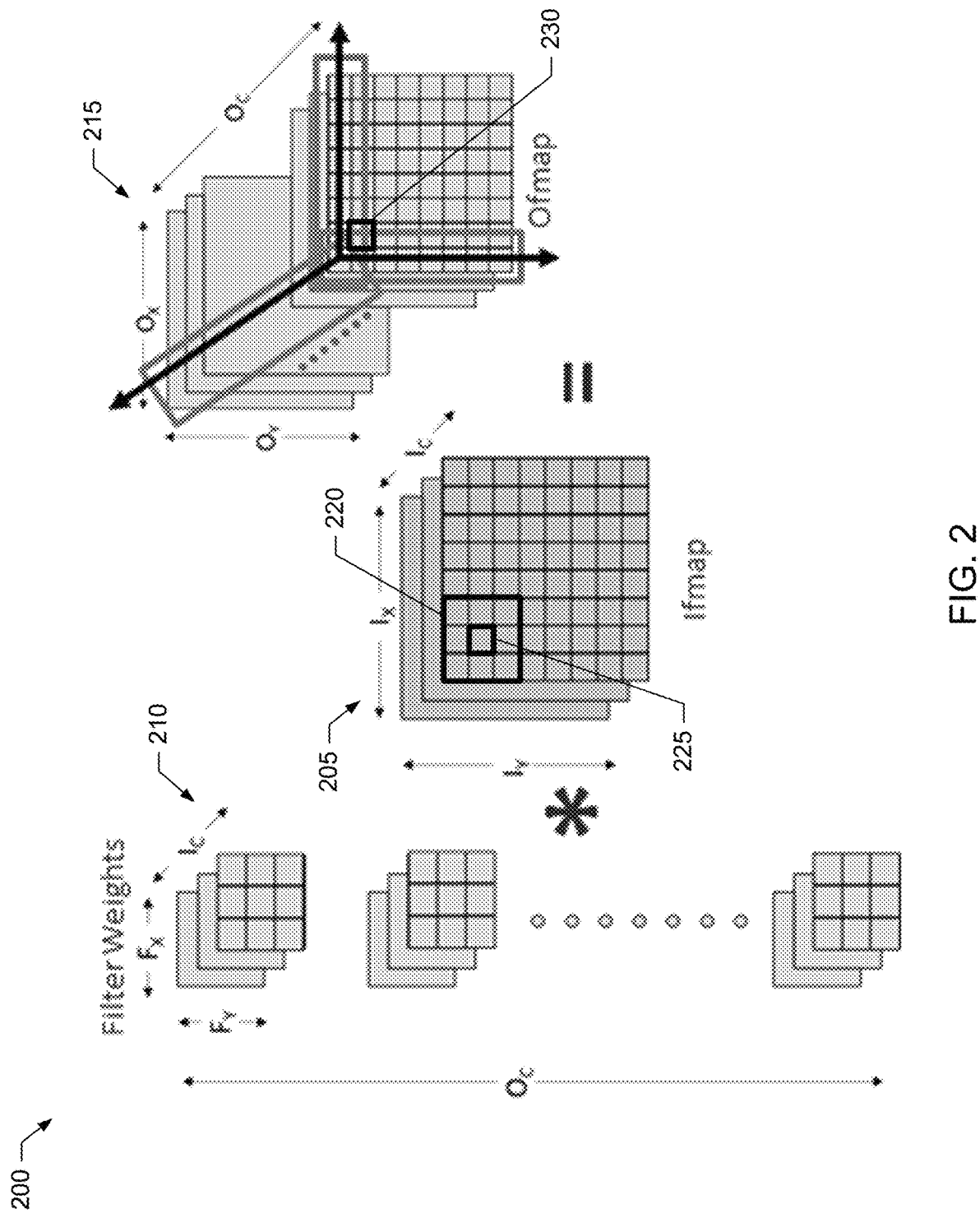
FIG. 2 illustrates an example tensor operation performed by the configurable processor element array of FIG. 1.

The possible tensor processing templates provide different ways to decompose an overall tensor operation to be performed by the configurable processor element array 100 to implement a given neural network layer such that the overall tensor operation can be achieved by the combination of PEs 105a-i included in the configurable processor element array 100. Such an example overall tensor operation 200 to be performed by the configurable processor element array 100 to implement a given neural network layer is illustrated in FIG. 2. The example of FIG. 2 introduces notation to be used throughout the instant disclosure.

The example tensor operation 200 corresponds to a neural network layer in which a set of input data 205, also referred to as input activation data 205 or input activations 205, is to be convolved with a set of filter kernels 210, also referred to as filter weights 210 or simply weights 210, to produce a set of output data 215, also referred to as output activation data 215 or output activations 215. In the illustrated example, the input activations 205 are arranged in arrays having $I_x$ elements in the x-dimension, $I_y$ elements in the y-dimension, and $I_c$ different channels of input activation data. The dimensions $I_x$, $I_y$ and $I_c$ may be the same or different, and may be any value(s). For example, if the neural network layer corresponding to the tensor operation 200 is an input layer (e.g., a first layer) of an image processing neural network, the $I_x$ and $I_y$ dimensions may correspond to the number of pixels in the rows and the columns, respectively, of an input image, and the k dimension may correspond to the number of channels of image data, such as 3 channels for image data represented in red-blue-green (RGB) format. As another example, if the neural network layer corresponding to the tensor operation 200 is an intermediate layer (e.g., a second layer) of the image processing neural network, the $I_x$ and $I_y$ dimensions may correspond to the number of pixels in the rows and the columns, respectively, of the image being processed, and the $I_c$ dimension may correspond to the number of different filters, such as 64 filters or some other number of filters, convolved with the input activation data of the previous neural network layer.

In the illustrated example, the input activation data 205 having dimensions $I_x$ by $I_y$ by $I_c$ is processed by a set of filters 210. In the illustrated example, the filters 210 are arranged in arrays having $F_x$ elements (e.g., weights) in the x-dimension, $F_y$ elements (e.g., weights) in the y-dimension, and $I_c$ elements in the channel dimension, the latter being the same as the number of channels $I_c$ of the input activation data. For example, the $F_x$ and $F_y$ dimensions may each correspond to 3 and 3 such that a 3 by 3 filter 210 is convolved with each input activation data element and its adjacent neighbors. Of course, the filters 210 may have other values for the $F_x$ and $F_y$ dimensions, and the $F_x$ and $F_y$ dimensions may be the same or different from each other.

The example tensor operation 200 of FIG. 2 involves convolving each one of the filters 210 with the input activation data 205, and summing (accumulating) the resulting data over the channel dimension ($I_c$) to produce the output activation data 215. For example, a given filter 210a of the filters is convolved with a given portion 220 of the input activation data 205 centered at a given input activation data element 225. The result for each of the channel dimensions is summed (e.g., corresponding to accumulation over the $I_c$ dimensions) to produce an output activate data element 230 at an array position corresponding to the array position of the input activation data element 225, as shown. In the illustrated example, the convolving of each one of the filters 210 with the input activation data 205 produces the output activation data 215, which is arranged in arrays having $O_x$ elements in the x-dimension, $O_y$ elements in the y-dimension, and $O_c$ different channels of output activation data. The $O_x$ and $O_y$ dimensions may have the same value or different values, and may be the same or different from the $I_x$ and $I_y$ dimensions. The $O_c$ dimension may correspond to the number of different filters 210 convolved with the input activation data 205.

Other terminology used in the instant disclosure is as follows. $O_n$ refers to the batch size. For example, if the configurable processor element array 100 is to implement a convolutional neural network to process images, then $O_n$ refers to the number of images to be processed in parallel. The abbreviation "IF" is used to refer to input activation data, the abbreviation "FL" is used to refer to filter data (e.g., weights), and the abbreviation "OF" is used to refer to output activation data. Furthermore, the term "Psum" is used to refer to a partial result in the convolution operation, and is described in further detail below.

Figure 3:
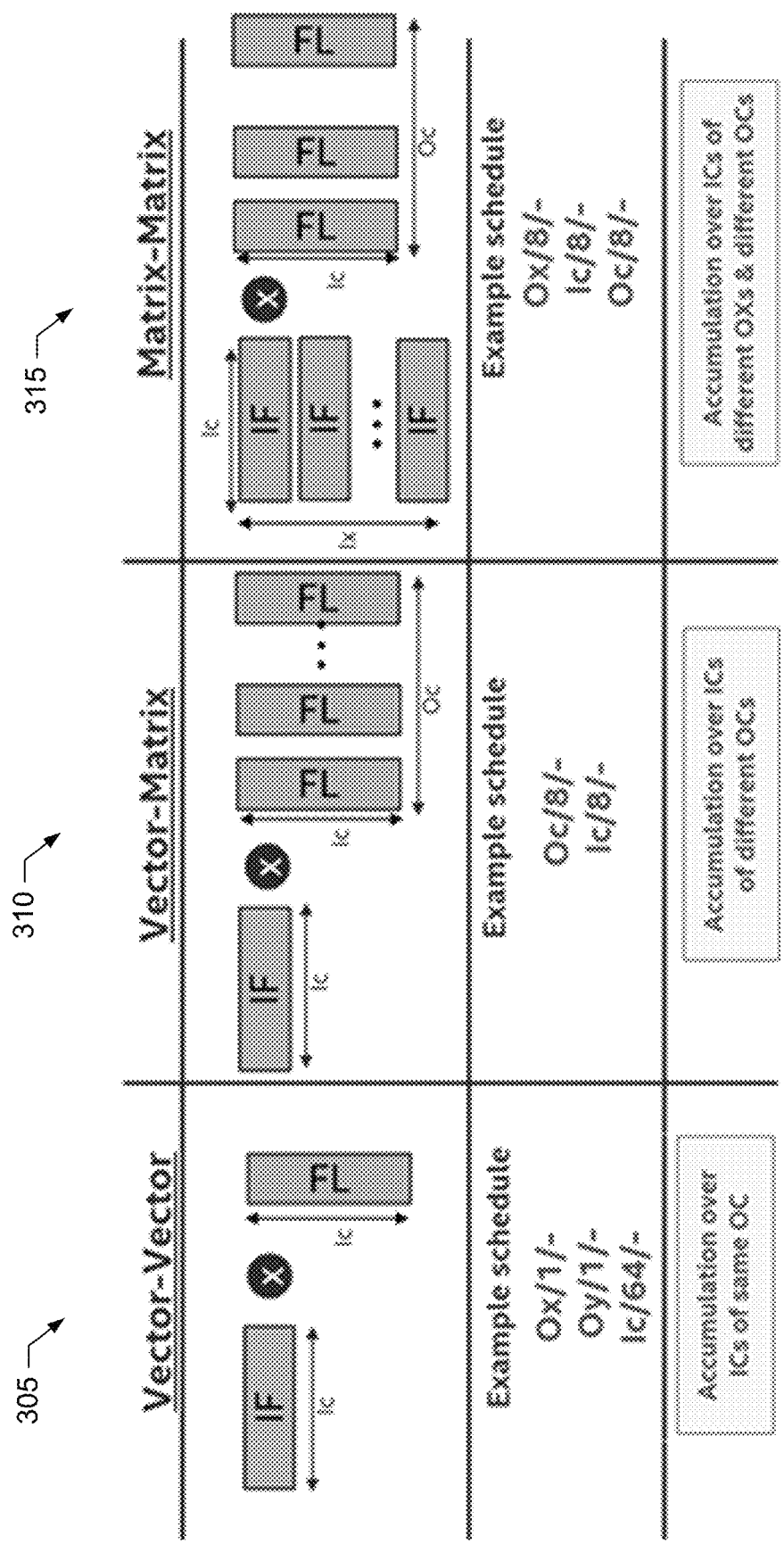
FIGS. 3-4 illustrate example tensor processing templates and corresponding example dataflow schedules to be implemented by example processor elements included in the configurable processor element array of FIG. 1.
Figure 4:
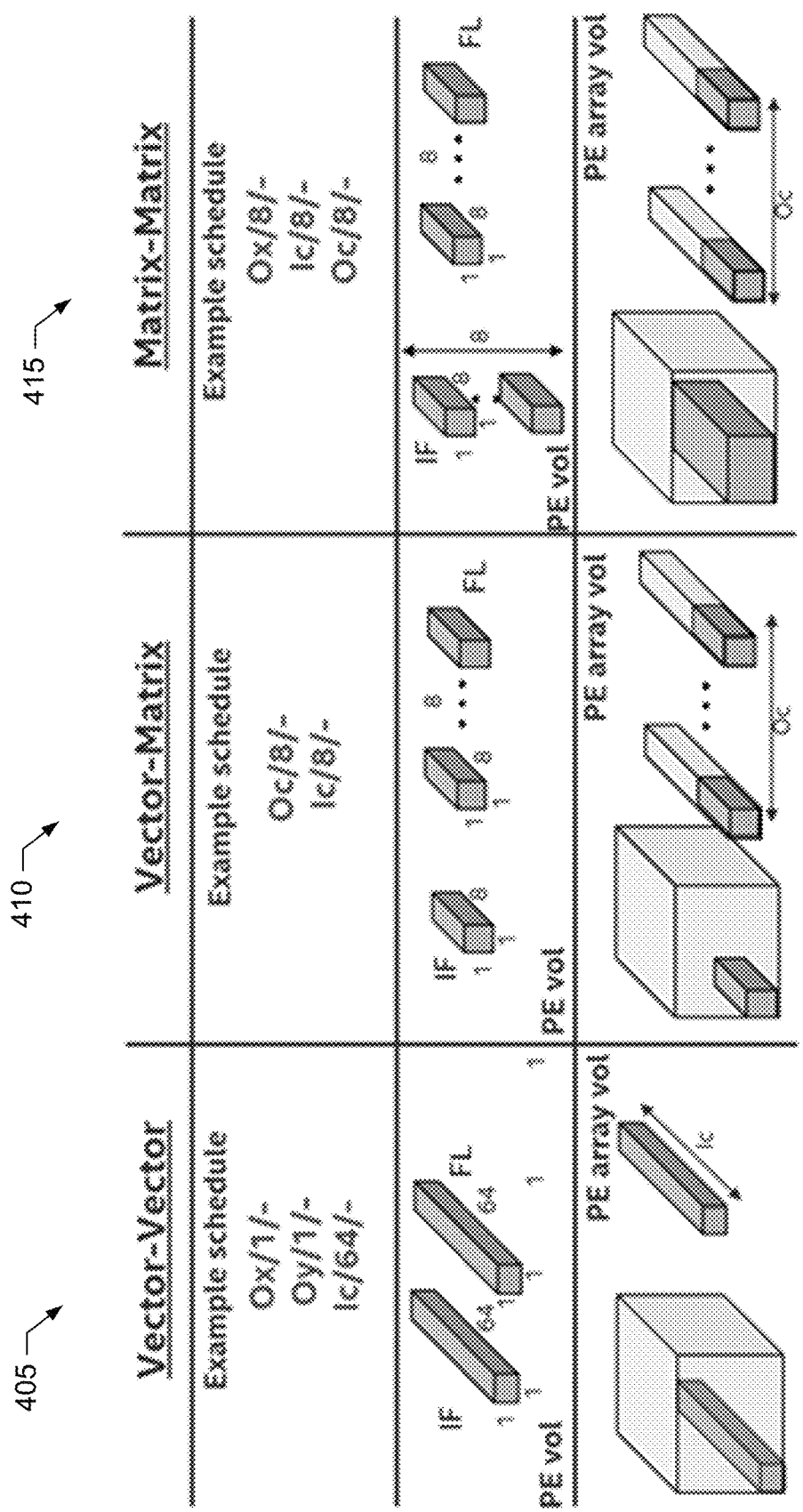

Example tensor processing templates 305, 310 and 315, and corresponding example dataflow schedules 405, 410 and 415, to be implemented by example PEs 105a-i included in the configurable processor element array 100 of FIG. 1 are illustrated in FIGS. 3 and 4, respectively. The tensor processing template 305 is an example of a vector-vector tensor processing template. The tensor processing template 310 is an example of a vector-matrix tensor processing template. The tensor processing template 315 is an example of a matrix-matrix tensor processing template. The dataflow schedule 405 represents a mapping of a portion of an example tensor operation, which implements a given layer of an example convolutional neural network, to one of the PEs 105a-i according to the vector-vector tensor processing template 305. The dataflow schedule 410 represents a mapping of a portion of an example tensor operation, which implements a given layer of an example convolutional neural network, to one of the PEs 105a-i according to the vector-matrix tensor processing template 310. The dataflow schedule 415 represents a mapping of a portion of an example tensor operation, which implements a given layer of an example convolutional neural network, to one of the PEs 105a-i according to the matrix-matrix tensor processing template 315. Other tensor processing templates, such as a scalar-vector processing template, can be supported by the example configurable processor element array 100.

The illustrated examples of FIGS. 3 and 4 use the notation "$DT_d/j/k$" to define a particular tensor processing template. In this notation, "DT" refer to the data type, which can be "I" for input activation data to be processed by the PE according to the defined template, or "O" for output activation data to be produced by the PE according to the defined template. The notation "d" represents dimensions, and can be either "x," "y" or "c." The notation "j" represents the number of elements of the data type "DT" in the dimension "d" to be processed by a given PE according to the defined template. The notation "k" represents the number of PEs to be involved in processing/producing the elements of the data type "DT" in the dimension "d" to yield the overall tensor operation output for the given neural network layer being implemented according to the defined template. In the illustrated example, the notation "k" is set to a dash (-) when referring to the template being applied to a single one of the PEs 105a-i. In the illustrated example, when a particular data type and/or dimension is omitted, the template is assumed to specify that the PE is to process/produce one (1) element of that data type in that dimension.

For example, the tensor processing template 305 of the illustrated example is defined by the notation "$O_x/1/-$," "$O_y/1/-$" and "$I_c/64/-$," which specifies that a PE configured according to that template is to process 64 elements of IF data in the $I_c$ dimension to produce OF data at one (1) position in the $O_x$ and $O_y$ dimensions. The tensor processing template 310 of the illustrated example is defined by the notation "$O_x/8/-$" and "$I_c/8/-$," which specifies that a PE configured according to that template is to process eight (8) elements of IF data in the $I_c$ dimension to produce OF data at eight (8) positions in the $O_c$ dimension at one (1) position in the $O_x$ and $O_y$ dimensions. The tensor processing template 315 of the illustrated example is defined by the notation "$O_x/8/-$," "$I_c/8/-$" and "$O_c/8/-$," which specifies that a PE configured according to that template is to process elements of IF data at eight (8) positions of the $O_x$ dimension and eight (8) positions of the $I_c$ dimension to produce OF data at eight (8) positions in the $O_c$ dimension and one (1) position in the $O_x$ and $O_y$ dimensions. As illustrated by the example dataflow schedule 405, the vector-vector tensor processing template 310 can be used to configure ones of the PEs 105a-i to implement dataflow schedules to perform respective portions of a tensor operation that correspond to multiplying a vector with a vector, such as schedules that compute 1 element of data at a given $O_x$ and $O_y$ position by accumulating a number (e.g., 64 in the example) of elements of filtered IF data (e.g., the IF data multiplied by the corresponding FL data) over the Ic dimension at that $O_x$ and $O_y$ position. As illustrated by the example dataflow schedule 410, the vector-matrix tensor processing template 310 can be used to configure ones of the PEs 105a-i to implement dataflow schedules to perform respective portions of a tensor operation that correspond to multiplying a vector with a matrix, such as schedules that compute a first number (e.g., 8 in the example) of elements of data in the Oc dimension at a given $O_x$ and $O_y$ position by accumulating a second number (e.g., 8 in the example) of elements of IF data over the Ic dimension at that $O_x$ and $O_y$ position after filtering with corresponding FL data from the first number of filters. As illustrated by the example dataflow schedule 415, the matrix-matrix tensor processing template 315 can be used to configure ones of the PEs 105a-i to implement dataflow schedules to perform respective portions of a tensor operation that correspond to multiplying a matrix with a matrix, such as schedules that compute a first number (e.g., 8 in the example) of elements of data in the Oc dimension at each of a second number (e.g., 8 in the example) of positions in the $O_x$ dimensions, but at the same $O_y$ position, by accumulating a third number (e.g., 8 in the example) of elements of IF data over the Ic dimension at those $O_x$ positions and $O_y$ position after filtering with corresponding FL data from the third number of filters.

Figure 5:
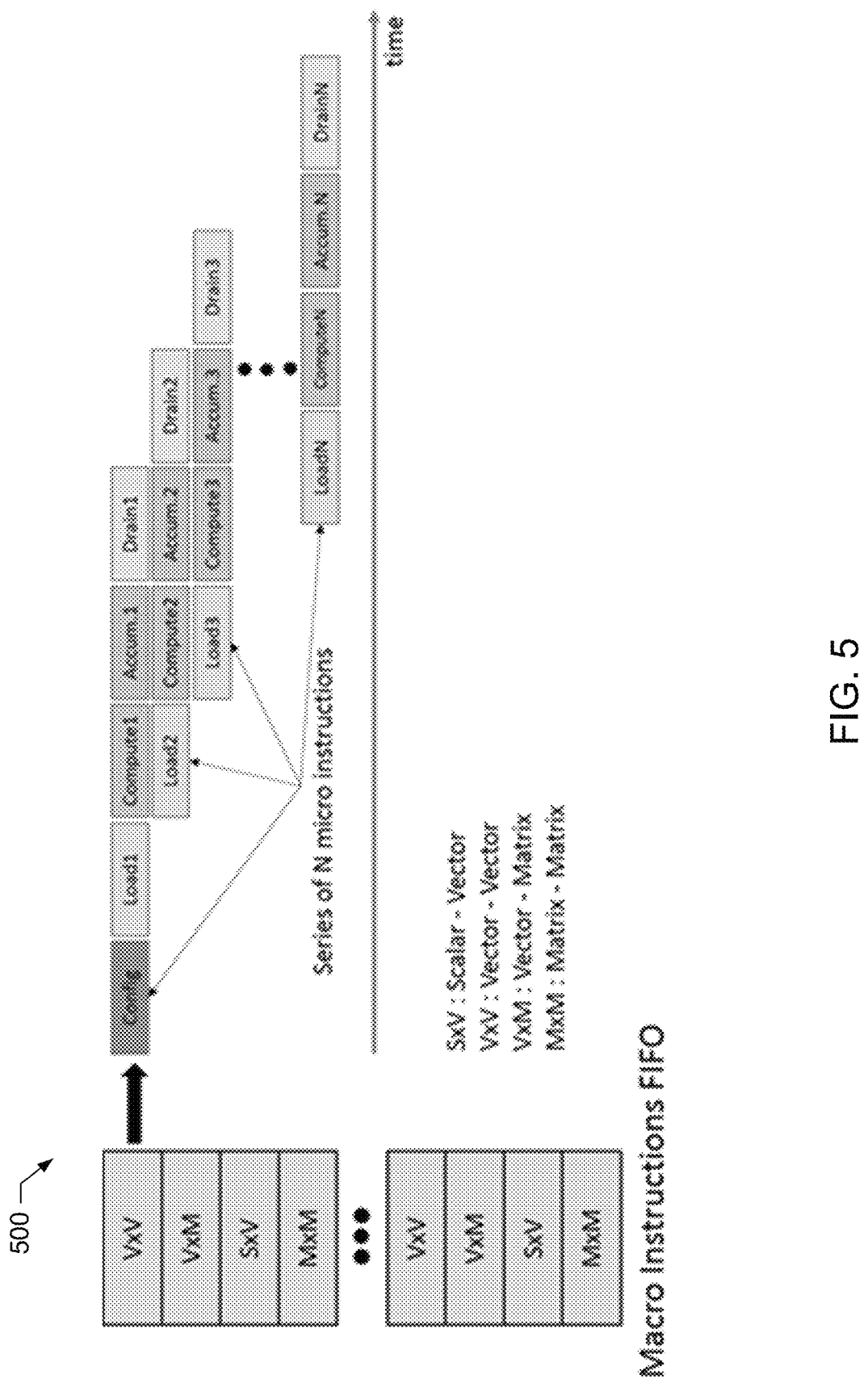
FIG. 5 illustrates an example operation pipeline implemented by the configurable processor element array of FIG. 1.

After a particular dataflow for a convolutional neural network layer is mapped onto one of the possible tensor templates, the macro level instructions represented by the notation "$DT_d/j/k$" are decomposed (e.g., by a compiler) into several micro instructions that can be processed by a given PE using a flexible PE pipeline. FIG. 5 illustrates an example operation pipeline 500 implemented by PEs in the configurable processor element array 100 of FIG. 1. The example pipeline 500 represents the decomposition of the macro granularity instructions into multiple simpler micro instructions, such as configure, load, compute, accumulate and drain. In the illustrated example, the same set of micro instructions can be used to implement different macro instructions. To accomplish this, the fields within the micro instructions vary to accommodate the different possible tensor processing templates (e.g., vector-vector tensor processing templates, vector-matrix tensor processing templates, matrix-matrix tensor processing templates, scalar-vector tensor processing templates, etc.).

Returning to FIG. 1, the example configurable processor element array 100 performs computations on IF, FL and OF tensor data (as well as Psum tensor data, as described below) based on a dataflow schedule configured for a current layer of a convolutional neural network, with the dataflow schedule being cast into one of the vector-vector, vector-matrix, matrix-matrix or scalar-vector tensor processing templates. As described above, the configurable processor element array 100 includes the configuration registers 120 to accept configurable descriptors that control the dataflow corresponding to one of a set of possible tensor processing templates. The configurable processor element array 100 also includes the array of PEs 105a-i, which is arranged as an N×N grid of individual PEs 105a-i (e.g., where N=16 or some other value).

The configurable processor element array 100 of the illustrated example further includes column buffer storage 135a-c to buffer data between the SRAM banks of the memory 125 and the local register file storage within the PEs 105a-i, with respective ones of the column buffers 135a-c associated with corresponding ones of the columns 115a-c of PEs 105a-i. In the illustrated example, the column buffers 135a-c also include respective example output data processors 138a-c capable of performing truncation and/or rectified linear unit (ReLU) operations on data being output from the PEs 105a-i for storage in the memory 135. The configurable processor element array 100 of the illustrated example includes example dedicated buses 140a-c for moving IF, FL and OF tensor data, respectively, between array of PEs 105a-i and the column buffers 135a-c.

As shown in the illustrated example, respective ones of the PEs 105a-i include example register file (RF) local storage 145a-c to store IF, FL and OF tensor data, respectively, for that PE. Respective ones of the PEs 105a-i also include an example multiple-and-accumulate (MAC) unit 150 (which may be pipelined) to perform multiplication and accumulation operations on the IF and FL data to be processed by that PE, an example elementwise computation unit 155 to perform elementwise operations on IF data to be processed by that PE, and an example max-pooling unit 160 with an example pooler register 165 to perform max-pooling operations to produce OF tensor data associated with that PE. Respective ones of the PEs 105a-i further include example configuration registers(s) 170 and an example finite state machine (FSM) 175. The FSM 175 manages (i) loading of IF and FL tensor data from RF storage 145a-b into the different compute units 150-160 within the PE, (ii) sequencing of computation within a respective compute unit 150-160, (iii) providing of control signals for accumulation of partial sums within a PE depending on a configured dataflow schedule, (iv) providing of control signals for transfer of partial sum OF tensor data to and from the PE for accumulation of partial sums across different processing iterations and/or across PEs, (v) extraction of completed OF tensor data from the PE into the SRAM buffers of the memory 135 via the column buffers 135a-c, where truncation and/or ReLU operations can take place to prune the OF tensor data from one size (e.g., 32 bit data) to a different (e.g., smaller) size (e.g., 8 bits) before storing into the SRAMs of the memory 125 for next layer computation.

Table 1 below depicts an example set of the descriptor fields to support flexible dataflow schedules by controlling the appropriate sequencing of the various computation phases of input tensor data within the PEs 105a-i according to one or a set of possible tensor processing templates.

TABLE 1

| Descriptor Fields | Descriptions |
| --- | --- |
| Stride | Stride parameter for a given network layer |
| IcPF | Ic partition factor, indicates how many PEs are working on the sameinput channel |
| PEColActv | One-hot encoding of active PEs in a column |
| PERowActv | One-hot encoding of active PEs in a row |
| OpPEColActv | One-hot encoding of active site PEs for OF extraction in a column |
| OpPERowActv | One-hot encoding of active site PEs for OF extraction in a row |
| TotalWrIFRF | Total number of input activation tensor data writes into IF register file |
| TotalWrFLRF | Total number of weight tensor data writes into FL register file |
| TotalWrOFRF | Total number of output activation tensor data writes into OF register file |
| StAddrIFRF | Start address within IF RF for a sub-block of compute |
| LenAddrIFRF | Total number of points within IF RF accessed for a sub-block of compute |
| Reset2StartIF | Boolean value to indicate whether IF RF address needs to be reset to start address |
| IncCycIFRF | Total number of cycles after which IF RF access address needs to be incremented |
| StAddrFLRF | Start address within FL RF for a sub-block of compute |
| LenAddrFLRF | Total number of points within FL RF accessed for a sub-block of compute |
| Reset2StartFL | Boolean value to indicate whether FL RF address needs to be reset to start address |
| IncCycFLRF | Total number of cycles after which FL RF access address needs to be incremented |
| StAddrOFRF | Start address within OF RF for a sub-block of compute |
| LenAddrOFRF | Total number of points within OF RF accessed for a sub-block of compute |

TABLE 1-continued

| Descriptor Fields | Descriptions |
| --- | --- |
| Reset2StartOF | Boolean value to indicate whether OF RF address needs to be reset to start address |
| IncCycOFRF | Total number of cycles after which OF RF access address needs to be incremented |
| BlocksPERF | Total number of sub-compute blocks in RF for one macro block round of compute |
| NumPEComp | Total number of unit level computations in one macro block round of compute |
| IcMapDirX | Boolean value to indicate if same Ic has been mapped across PEs within a row |
| IcMapDirY | Boolean value to indicate if same Ic has been mapped across PEs within a column |
| NumIncStAddr | Number of different start addresses of IF RF when processing different Fx and Fy |
| IncStAddrPerBlockIFRF | Increment of the start address of the IF RF when processing differentFx and Fy (convolution filter dimension Fx or Fy > 1) |
| StepIFRF | Step of address increment when accessing IF RF |
| ExtPsum | Boolean value to indicate whether the schedule requires external Psum accumulation |
| OFGenStartNthBlock | Total number of macro block compute for one block of generation |
| PsumLoadStartNthBlock | Total number of macro block compute until reloading of previously computed Psum |
| LinesPsumPerLoad | Total number of lines in one round of Psum load |
| LinesTotalPsum | Total number of lines to be loaded for reloading all of external Psum |
| Relu | Boolean value to indicate if ReLU is to be activated for a particular layer |
| ReluThreshold | ReLU threshold value to be used in case ReLU is activated for the layer |
| EltWise | Boolean value to indicate if element-wise operation is to be performed for the layer |
| Drain2FLSRAM | Boolean value to indicate drain of $2^{nd}$ operand to FL SRAM during eltwise operation |
| Maxpool | Boolean value to indicate if maxpool operator is to be activated for the layer |

The descriptor fields of Table 1 are applied to each of the PEs included in the configurable processor element array 100. As such, although each of the PEs that is active will operate on different blocks of the total amount of IF and FL data for a given network layer, the volume of data operated on by each of the PEs that is active will operate will be similar. In Table 1, the Stride descriptor field is a parameter of the convolutional neural network. The IcPF descriptor field is the Ic partitioning factor indicating how many PEs are working on partitions of the data in a given Ic dimension. Thus, this field indicates how many PEs have partial sums that need to be accumulated in the Ic dimension. The PEColActv descriptor field indicates which of the columns 115a-c of the PEs 105a-i are active in the configurable processor element array 100. The PERowActv descriptor field indicates which of the rows 110 a-c of the PEs 105a-i are active in the configurable processor element array 100. The OpPEColActv descriptor field indicates which of the columns 115a-c will have the output for the current network layer being implemented. The OpPERowActv descriptor field indicates which of the rows 110 a-c will have the output for the current network layer being implemented. For example, the IcPF descriptor field descriptor field indicates when the Ic dimension is partitioned across multiple PEs 105a-i. In such a scenario, some of the PEs 105a-i will produce just partial sum contributions to the output data, and The OpPEColActv and OpPERowActv descriptor fields indicate which PEs 105a-i will have the final output data after the partial sums are accumulated.

In Table 1, The TotalWrIFRF descriptor field indicates how many IF data points are to be written to a PE 105a-i.

The TotalWrFLRF descriptor field indicates how many FL data points are to be written to a PE 105a-i. The TotalWrOFRF descriptor field indicates how many OF data points are to be written to a PE 105a-i.

In Table 1, the StAddrIFRF descriptor field indicates the start address of the IF RF storage 145a. The LenAddrIFRF descriptor field indicates how many IF data points are to be accessed during a computation cycle. For example, consider the tensor processing template 315 in which there are 8 filter channels (FL) and each channel is to process 8 IF data points in a different Ix dimension. The LenAddrIFRF descriptor field would indicate that each group of 8 IF data points would be processed by a different filter channel. The Reset2StartIF descriptor field indicates whether the PE 105a-i is to reset to the start address in the IF RF storage 145a when the value of the LenAddrIFRF descriptor field is reached or whether the PE 105a-i should continue incrementing through the IF RF storage 145a. The IncCycIFRF descriptor field indicates the number of computation cycles after which the start address of the IF RF storage 145a is to be incremented.

Likewise, the StAddrFLRF descriptor field indicates the start address of the FL RF storage 145b. The LenAddrFLRF descriptor field indicates how many FL data points are to be accessed during a computation cycle. The Reset2StartFL descriptor field indicates whether the PE 105a-i is to reset to the start address in the FL RF storage 145b when the value of the LenAddrFLRF descriptor field is reached or whether the PE 105a-i should continue incrementing through the FL RF storage 145b. The IncCycFLRF descriptor field indicates the number of computation cycles after which the start address of the FL RF storage 145b is to be incremented.

Likewise, the StAddrOFRF descriptor field indicates the start address of the OF RF storage 145c. The LenAddrOFRF descriptor field indicates how many OF data points are to be accessed during a computation cycle. The Reset2StartOF descriptor field indicates whether the PE 105a-i is to reset to the start address in the OF RF storage 145c when the value of the LenAddrOFRF descriptor field is reached or whether the PE 105a-i should continue incrementing through the OF RF storage 145c. The IncCycOFRF descriptor field indicates the number of computation cycles after which the start address of the OF RF storage 145c is to be incremented In Table 1, the BlocksPERF descriptor field indicates have many blocks of compute work are performed by a PE 105a-i, with a block of work corresponding to computing 1 output point (or 1 partial sum associated with a given output point). The NumPEComp descriptor field indicates how many cycles are needed to process the volume of data brought into the PE 105a-i for processing according to the configured tensor processing template. For example, the vector-vector tensor processing template 305, which is to process 64 elements of IF data in the dimension with 64 elements of FL data to produce OF data at 1 position in the $O_x$ and $O_y$ dimensions, will utilize 64 cycles, which corresponds to the 64 multiply-and-accumulate operations used to multiply the 64 elements of IF data in the dimension with 64 elements of FL data and accumulate the results.

In Table 1, the IcMapDirX descriptor field is a Boolean value (e.g., True or False) to indicate whether the partitioning of an IC dimension is mapped across the rows 110a-c of the PEs 105a-i. The IcMapDirY descriptor field is a Boolean value (e.g., True or False) to indicate whether the partitioning of an IC dimension is mapped across the columns 115a-c of the PEs 105a-i. These descriptor fields indicate how partial sums are to be shared among the PEs 105a-i.

In Table 1, the NumIncStAddr descriptor field, the IncStAddrPerBlockIFRF descriptor field and the StepIFRF descriptor field are used to specify how FL data having the Fx and Fy dimensions is to be shifted across the IF data to produce the OF data.

In Table 1, the ExtPsum descriptor field is a Boolean value (e.g., True or False) to indicate whether the configured tensor processing template involves partial sums. If the value is False, then each PE can operate autonomously to output a given OF data point. If the value is True, then partial sums will be used to produce the OF data.

In Table 1, OFGenStartNthBlock descriptor field and the PsumLoadStartNthBlock descriptor field specify the number of times the configured tensor processing template is to be performed to generate an OF data point for the neural network layer being implemented, and when previously computed partial sums are to be reloaded for further accumulation. For example, if there are 256 Ic dimensions in the current network layer and the configured tensor processing template processes 64 Ic dimensions, then the configured tensor processing template is to be performed 4 times to process all the 256 Ic dimensions to determine an OF data point for the current neural network layer.

In Table 1, the LinesPsumPerLoad descriptor field specifies the size (e.g., in lines of SRAM) of the Psums to be loaded to accumulate partial sums based on the configured tensor processing template. The LinesTotalPsum descriptor field specifies the number of Psums to be loaded to compute an OF data point.

In Table 1, The Relu descriptor field is a Boolean value (e.g., True or False) to indicate whether the ReLU operation is active for the current neural network layer being implemented. The ReluThreshold descriptor field specifies the threshold to be used by the ReLU operation.

In Table 1, the EltWise descriptor field is a Boolean value (e.g., True or False) to indicate whether the elementwise operation is active for the current neural network layer being implemented. The Drain2FLSRAIV1 descriptor field is used with the elementwise operation In Table 1, the Maxpool descriptor field is a Boolean value (e.g., True or False) to indicate whether the maxpool operation is active for the current neural network layer being implemented.

Figure 6:
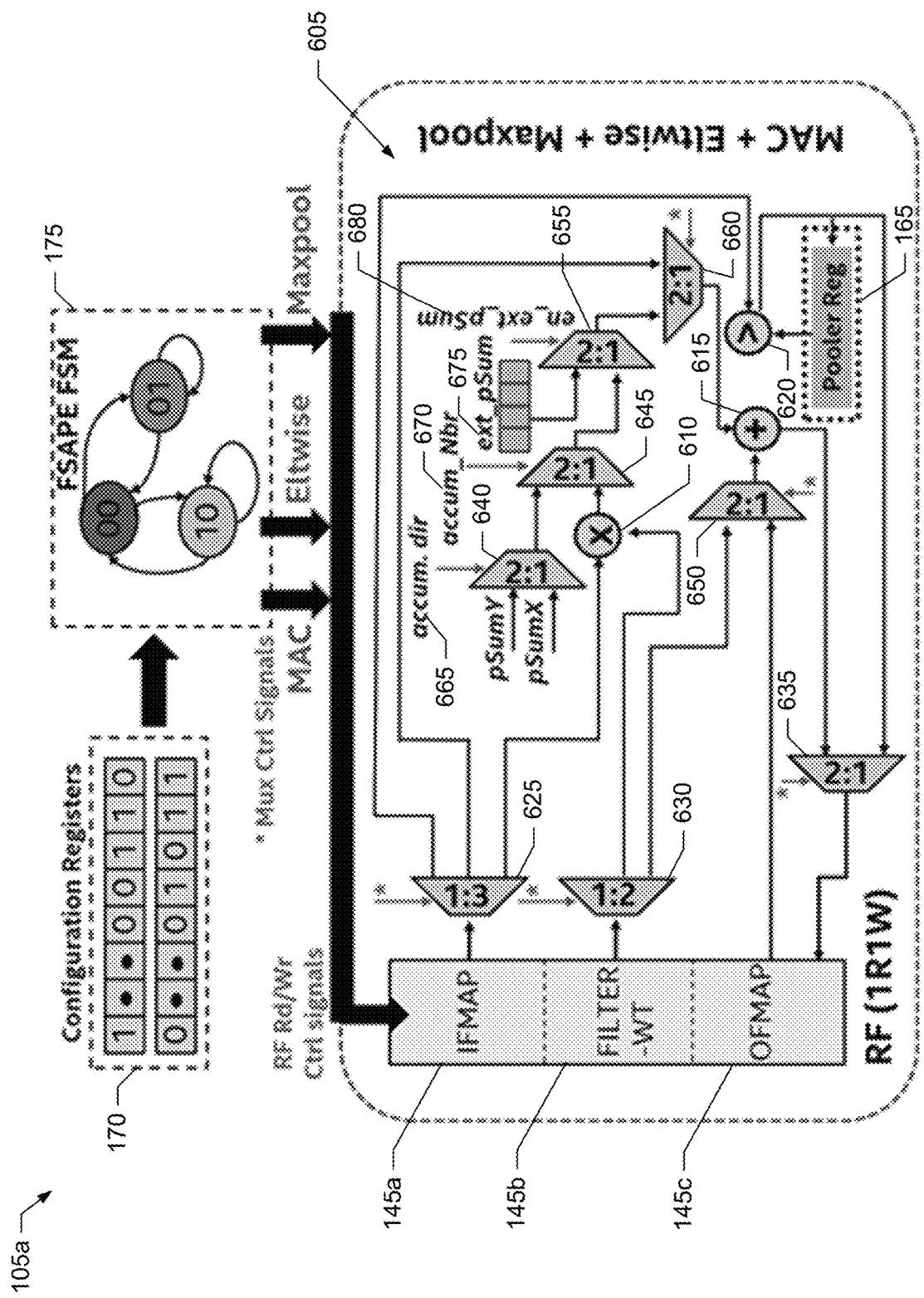
FIG. 6 is a block diagram of an example processor element included in the configurable processor element array of FIG. 1.

A block diagram of an example implementation of one of the PEs 105a-i of FIG. 1 is illustrated in FIG. 6. For convenience, the block diagram of FIG. 6 illustrates an example implementation of the PE 105a. However, the example implementation of FIG. 6 could be used to implement any of the PEs 105a-i. The example PE 105a of FIG. 6 includes the set of configuration registers 170 to accept values of the descriptors shown in Table 1, which are updated at the beginning of each layer of the convolutional neural network being processed by the PE 105a. In the illustrated example, the set of descriptor fields applied to the configuration registers 170 are programmed via the configuration loader 122 to implement a dataflow schedule, based on a tensor processing template, to process the IF and FL tensor data for a current layer (L) of the convolutional neural network being implemented. For example, the set of programmed descriptor fields are used by FSM 175 to perform data redirection during load, compute and drain operations to be performed on the input tensor data. As such, the configuration registers 170 in respective ones of the PEs 105a-i are an example of means for configuring the array of PEs 105a-i based on a plurality of descriptors to implement a layer of the convolutional neural network based on a dataflow schedule corresponding to one of a plurality of tensor processing templates.

The example PE 105a of FIG. 6 also includes the FSM 175. In the illustrated example, the FS 175 includes internal counters and logic to generate (i) read and write control signals to drive the IF, FL and OF register files 145a-c, (ii) multiplexer control signals to route data from the register files 145a-c into the appropriate one of the MAC computation unit 150, the elementwise computation unit 155 or the max-pooling computation unit 160 based on the type of operation (e.g., multiply and accumulate for the MAC unit 150, comparison for the max-pooling unit 160, etc.) to be performed by the PE 105a on the tensor data for current layer of the convolutional neural network being implemented. In the illustrated example, to generate the read and write control signals into IF, FL and OF register files 145a-c, the FSM 170 uses the "StAddr<IF/FL/OF>RF", "LenAddr<IF/FL/OF>RF", "Reset2Start<IF/FL/OF>", "IncCyc<IF/FL/OF>RF" descriptor fields for generation of relevant control signals. Internally, counters ifcount, wcount, and ofcount keep track of the addresses/indexes for the IF, FL, OF register files 145a-c, which are either incremented or reset depending on the number of input activations and weights (set by the "<LenAddrlF/FL>RF" descriptor field) required to compute each OF point (or pSum) during a block of computation. The number of blocks (set by "BlocksPERF" descriptor field) determines the total number of points (or pSums) to be written to the OF register file 145c. The dataflow for a given neural network layer (whether IF, FL, or OF stationary) is controlled internally by the above-mentioned counters, along with a signal generated by the "Reset2Start <IF/FL/OF>" descriptor field. The "StAddr<IF/FL/OF>RF" descriptor field keeps track of the start address of each of the register files 145a-c for each new block of computation. These internal structures and the associated control logic included in the FSM 170 support flexible dataflow schedules in the PE 105a.

In the illustrated example of FIG. 6, the PE 105a includes example shared computation logic 605, which is shared among the MAC computation unit 150, the elementwise computation unit 155 and the max-pooling computation unit 160 to achieve efficient hardware resource reuse. The example shared computation logic 605 includes an example multiplier 610, an example adder 615 and an example comparator 620, along with associated example multiplexer control logic 625, 630, 635, 640, 645, 650, 655 and 660 (collectively referred to as multiplexer control logic 625-660) to route the appropriate tensor data to one or more of the elements 610-615 to implement the processing of the MAC computation unit 150, the elementwise computation unit 155 or the max-pooling computation unit 160. In the illustrated example, the default configuration of the multiplexer control logic 625-660 of the shared computation logic 605 is to implement the max-pooling computation unit 160. The descriptor fields "Eltwise" and "Maxpool" are used to reconfigure the shared computation logic 605 to implement the elementwise computation unit 155 and the max-pooling computation unit 160, respectively.

The example PE 105a of FIG. 6 includes RF local storage 145a-c. The illustrated example includes three RFs 145a-c for storing IF, FL and OF tensor data, respectively. In the illustrated example, each of the RFs 145a-c is implemented by a group of 1-read-1-write registers, which support reading from one register and writing to one register simultaneously. In the illustrated example, the tensor data stored in IF and FL RFs 145a-b are 8 bits wide (although other example implementations can support other widths), and the tensor data stored in OF RF 145c is 32 bits wide (although other example implementations can support other widths) to accommodate partial sum accumulation feature for dataflow schedules in which all of input channels cannot be accumulated in one processing iteration/block and, thus, and partial sums are to be brought out of PE 105a and brought back in at a later point in time to complete final OF tensor data computation.

At the output of IF RF 145a, the example multiplexer logic 625 includes a 1:3 multiplexer to redirect IF tensor data to one of the MAC computation unit 150, the elementwise computation unit 155 or the max-pooling computation unit 160. At the output of FL RF 145b, the example multiplexer logic 630 includes a 1:2 multiplexer to redirect FL tensor data to one of the MAC computation unit 150 or the elementwise computation unit 155, because the max-pooling computation unit 160 does not operate on data housed in FL RF 145b. At the input to the OF RF 145c, the example multiplexer logic 635 includes a 1:2 multiplexer on the write path to the OF RF 145c to store the output of one of the MAC computation unit 150, the elementwise computation unit 155 or the max-pooling computation unit 160. Additional storage in the form of the pooler register 165 is used to store the intermediate results of the max-pooling computation unit 160.

The example PE 105a of FIG. 6 is structured to support both internal and external partial sum accumulation. The PE 105a can accept partial sum from its neighboring PE in either the horizontal (pSumX) or the vertical direction (pSumY). In some examples, the PE 105a cannot accept partial sums from other PEs in other directions. The programmable descriptor fields applied to the configuration registers 170 can be used to specify the direction of internal accumulation via an example "accum dir" signal 665. An example "accum Nbr" control signal 670 is used to identify whether the accumulation of partial sums is within the PE 105a or across PEs including the PE 105a and a permitted neighboring PE. For external partial sum accumulation, one set of values is held in an "extpSum" register 675 while the second set of values resides in the OF RF 145c. An example multiplexer control signal "en extpSum" 680 is used to choose between internal partial sum accumulation and external partial sum accumulation.

FIG. 7-12 illustrate example phases of operation supported by the example configurable processor element array 100 of FIG. 1, as well as example permissible transitions among the phases of operation supported for the configurable processor element array 100. As shown in the example state transition diagram 700 of FIG. 7, example phases of operation supported by the configurable processor element array 100 include an example configuration phase 705, an example load phase 710, an example compute phase 715, an example accumulation phase 720, an example external partial sum accumulation phase 725 and an example retrieval phase 730 (also referred to as an example drain phase 730). In the configuration phase 705, an example of which is illustrated in further detail in FIG. 8, descriptor values applied to the configuration registers 120 (or stored in the memory 125 in some examples) of the configurable processor element array 100 for the current neural network layer being implemented (as well as the subsequent neural network layer in some examples) are moved to the configuration registers 170 of the PEs 105a-i, and the FSMs 175 of the PEs 105a-i are configured based on those descriptors. For example, descriptor values are loaded into the configuration registers 170 of ones of the PEs 105a-i, which steer the computation to one of the possible tensor processing template types (e.g., vector-vector, vector matrix, matrix-matrix, scalar vector, etc.).

Figure 9:
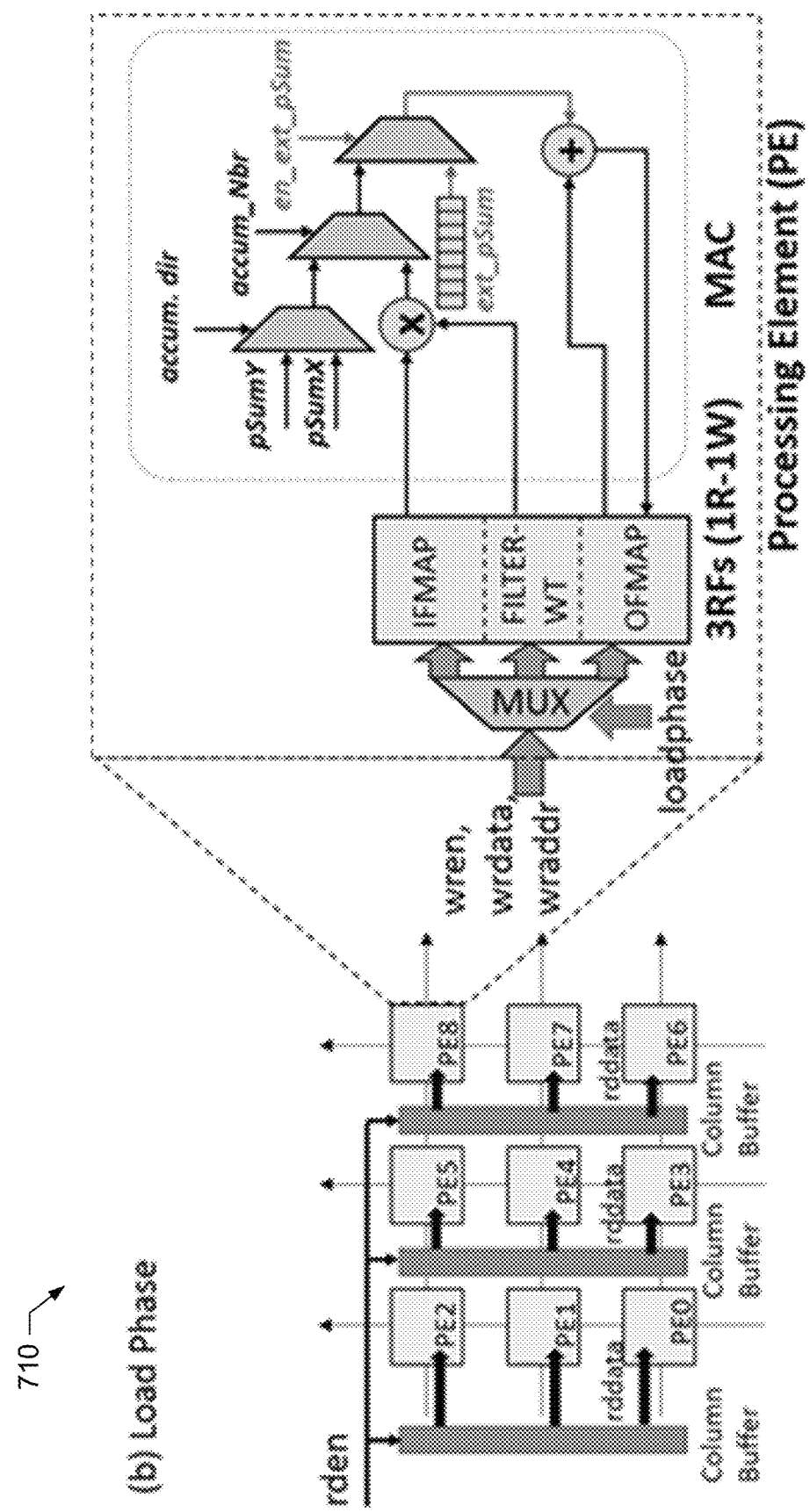
Figure 10:
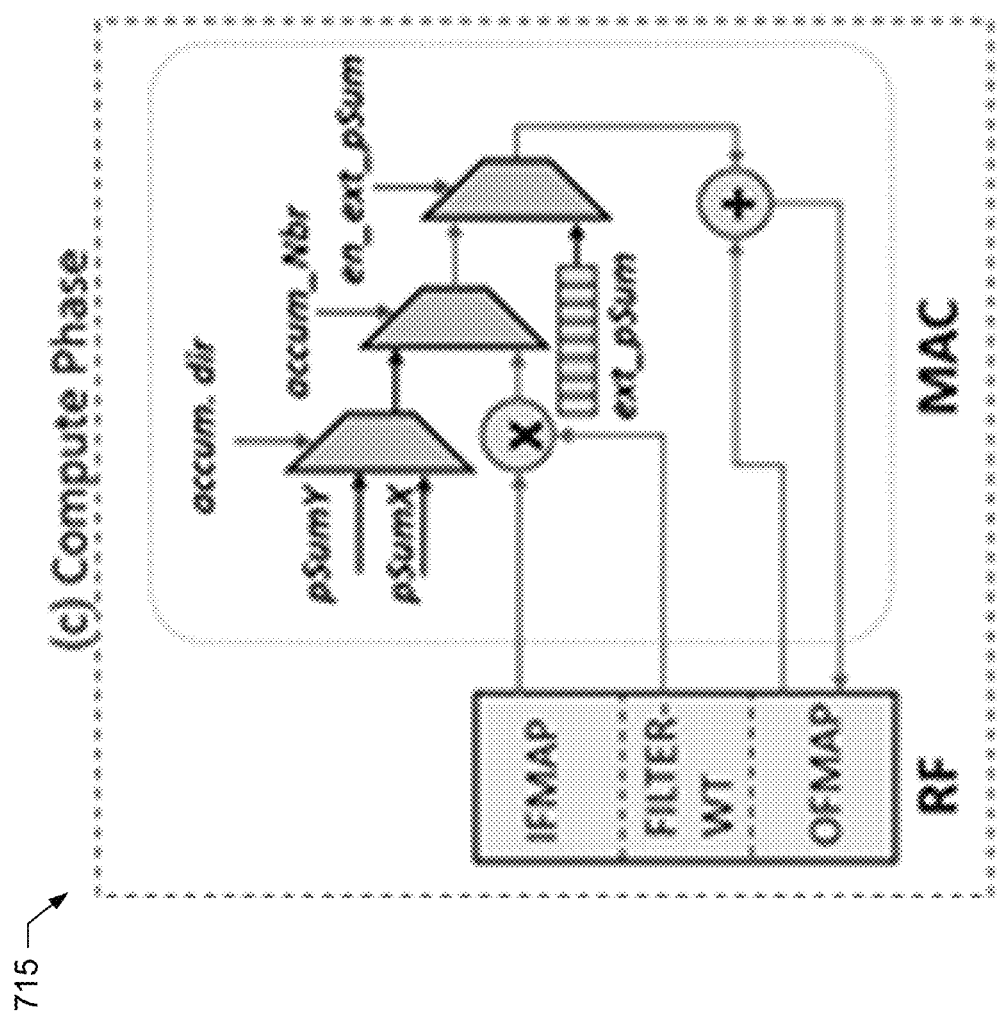
Figure 11:
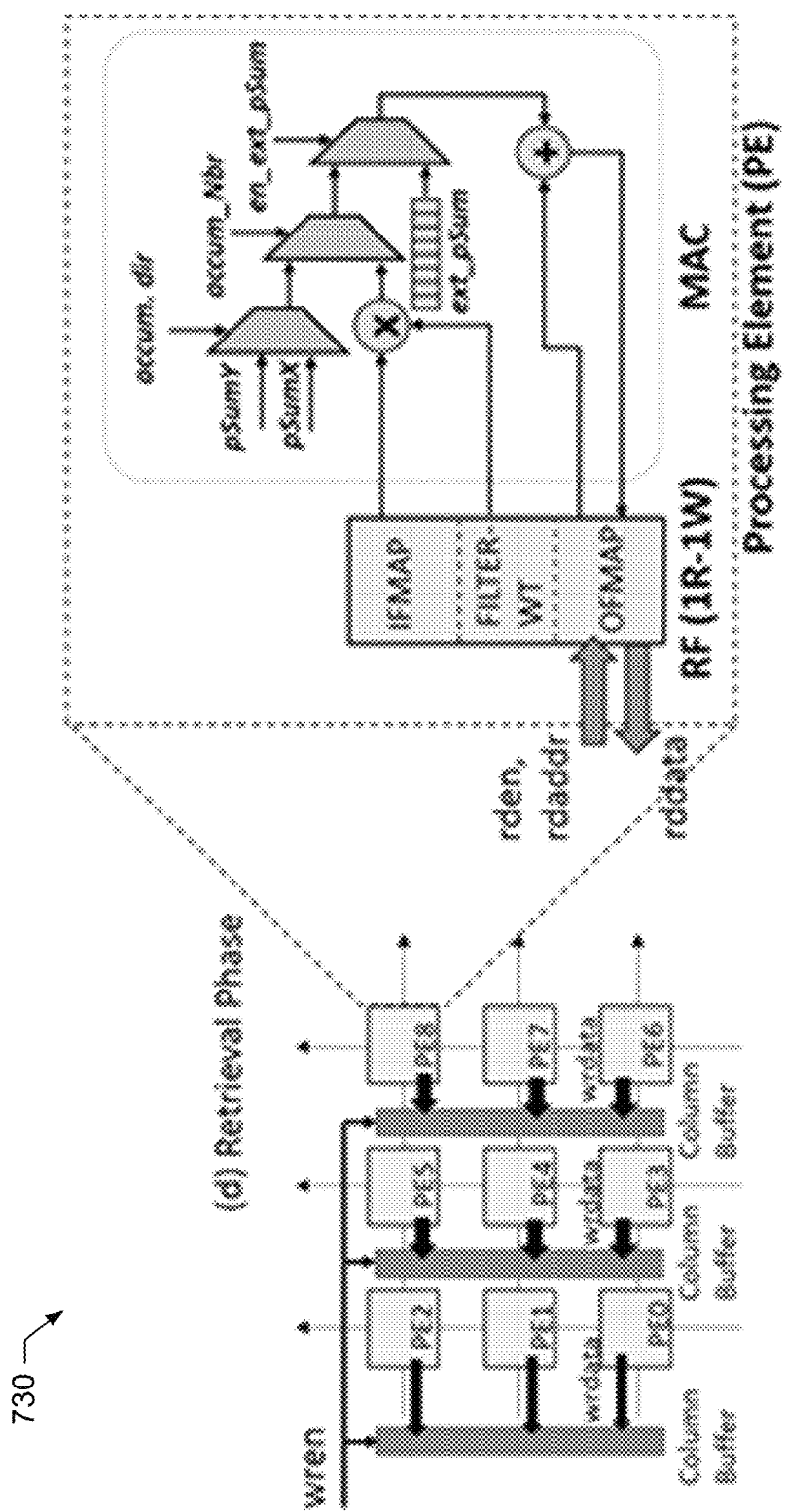
Figure 12:
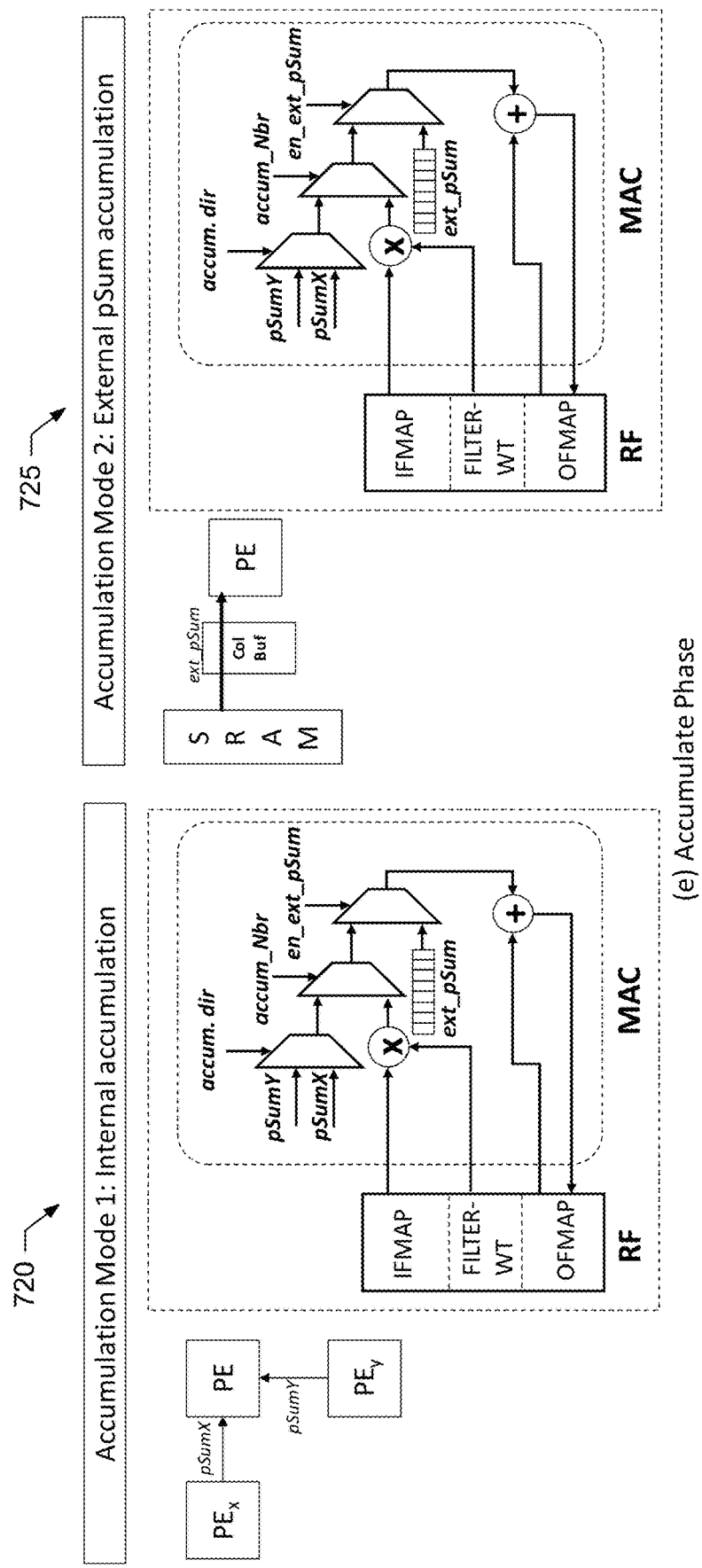

In the load phase 710, an example of which is illustrated in further detail in FIG. 9, tensor data is loaded from the memory 125 to the RFs 145a-c of the PEs 105a-i. For example, IF, FL or OF tensor data is transferred from the memory 125 via the column buffers 135a-c into the local RF storage 145a-c within ones of the PE 105a-i. In the compute phase 710, an example of which is illustrated in further detail in FIG. 10, arithmetic operations (e.g., one of MAC, elementwise or max-pool) are performed on the tensor data resident in the RFs 145a-c of ones of the PEs 105a-i. For example, ones of the PEs 105a-i may compute MAC operations to generate partial sums (Psums) or final OF tensor data for the current convolutional neural network layer being implemented. The internal accumulation phase 720 and the external partial sum accumulation phase 725, examples of which are illustrated in further detail in FIG. 12, respectively, are optional phases that may or may not exist for a given dataflow schedule configured to implement the current network layer L of a convolutional neural network. In the illustrated example, the internal accumulation phase 720 corresponds to an internal phase of accumulation in which partial sums of neighboring PEs that are working on separate input channels of the same OF tensor data are accumulated. The direction of accumulation is constrained to be either horizontal or vertical. In the external partial sum accumulation phase 725, partial sums that were computed earlier in time but had to be evicted out of local PE RF 145c are brought back into the PE for accumulation to generate the final OF tensor output. In the retrieval phase 730, an example of which is illustrated in further detail in FIG. 11, partial sums or final OF tensor data are transferred from the local PE RF 145c of ones of the PEs 105a-i into the respective column buffers 135a-c corresponding to those PEs 105a-i to be moved into the memory 125.

Figure 7:
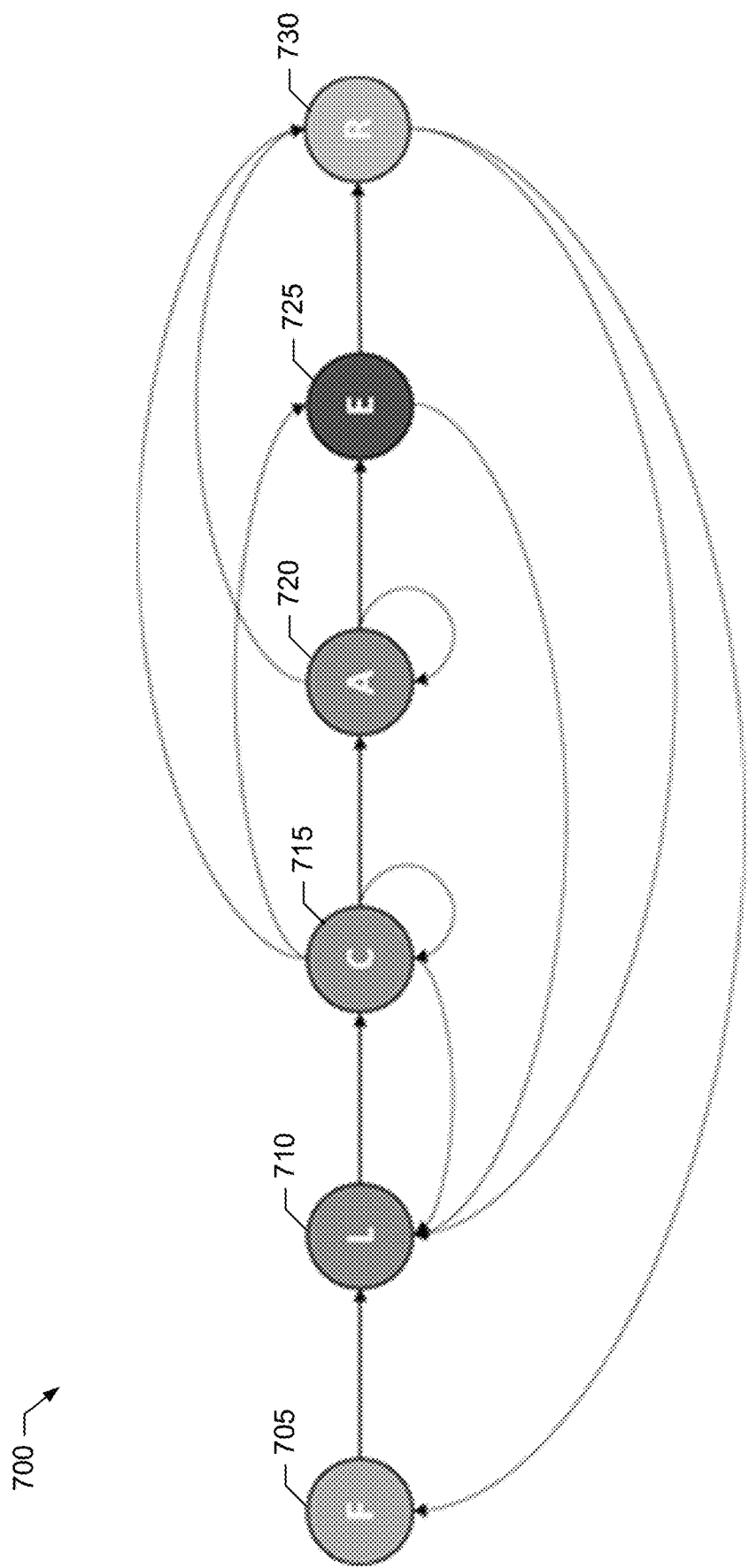
FIG. 7-12 illustrate example phases of operation and example transitions among phases of operation for the configurable processor element array of FIG. 1.
Figure 8:
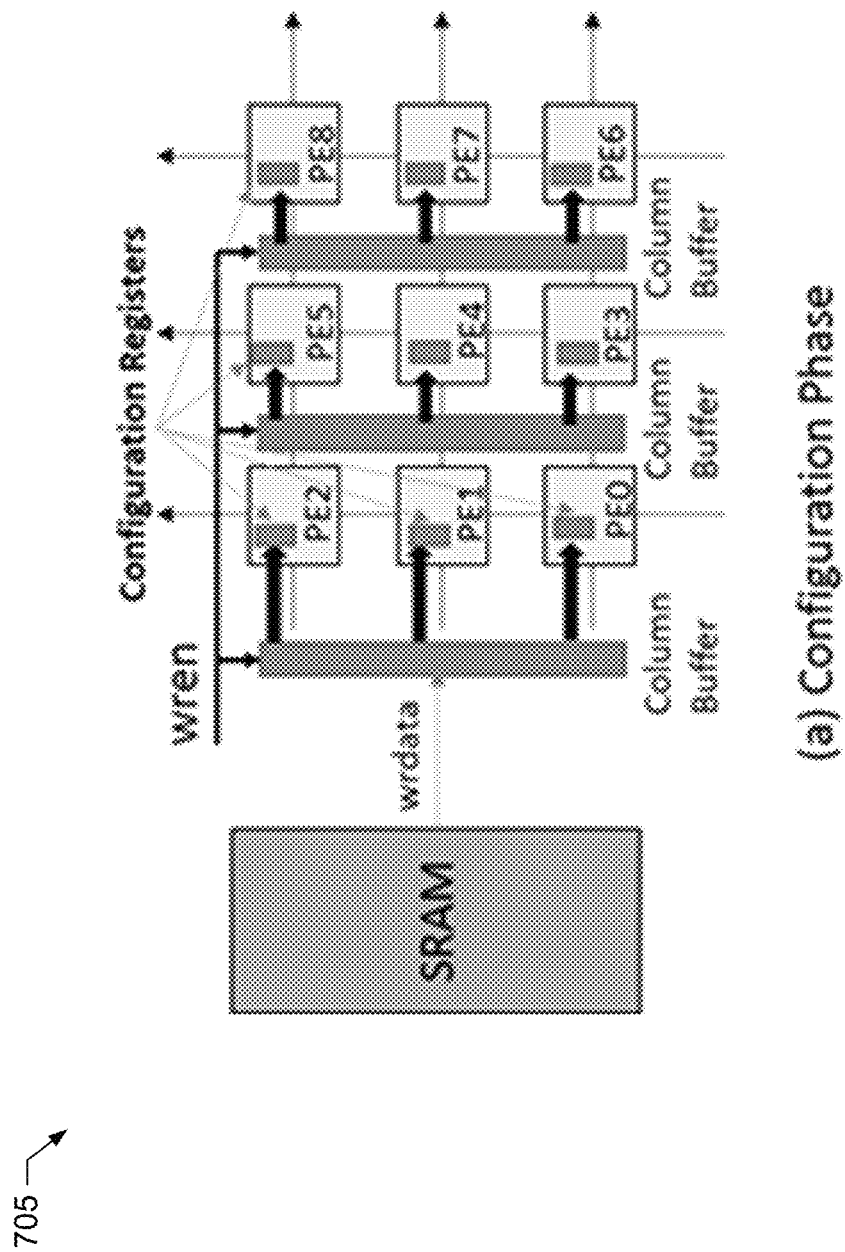

Permissible transitions among the configuration phase 705, the load phase 710, the compute phase 715, the internal accumulation phase 720, the external partial sum accumulation phase 725 and the retrieval phase 730 are represented by the directed lines of the state transition diagram 700 of FIG. 7. In the illustrated example state transition diagram 700, the configuration phase 705, the load phase 710, the compute phase 715 and the retrieval phase 730 are compulsory, whereas the internal accumulation phase 720 and the external partial sum accumulation phase 725 depend on the particular dataflow schedule being implemented. The example state transition diagram 700 starts with the configuration phase 705 in which the configuration registers 120 of the configurable processor element array 100 and then the configurations registers 170 of respective ones of the PEs 105a-i are populated with the descriptor fields. Processing then transitions to the load phase 710 in which IF and FL tensor data is moved from memory 125 into the PE RFs 145a-b of respective ones of the PEs 105a-i that are active for the current convolutional neural network layer being implemented.

In the illustrated example, one transition is allowed out of the load phase 710, which is a transition into the compute phase 715. From the compute phase 715, processing can transition to any of the load phase 710, the compute phase 715, the accumulation phase 720, the external partial sum accumulation phase 725 and the retrieval phase 730. For example, processing can stay in the compute phase 715 and continue computation, or processing can revert to the load phase 710 to load new IF/FL tensor data into the PEs 105a-i. This is typically the case when there is no Ic partitioning in the dataflow schedule for the current neural network layer being implemented. If there is Ic partitioning in the dataflow schedule for the current neural network layer being implemented, then processing transitions from the compute phase 715 to the internal accumulation phase 720 or the external partial sum accumulation phase 725 depending on whether all the Ic processing is partitioned among neighboring PEs 105a-i in the dataflow schedule for the current neural network layer, or is partitioned across different processing iterations performed by the same PEs 105a-i.

If a final OF result is available during a compute phase 715, then processing transitions to the retrieval phase 730. In the internal accumulation phase 720, once a final OF result is available, processing can transition to the retrieval phase 730 or, if it is the last round of internal accumulation before initiation of the external accumulate phase 725, processing transitions into the external accumulation phase 725. From the external accumulation phase 725, processing can transition into the load phase 705 to fetch additional partial sum data from the memory 125 or, once a final OF result is available, processing can transition to the retrieval phase 730 to transfer OF data to the memory 125.

Figure 13A:
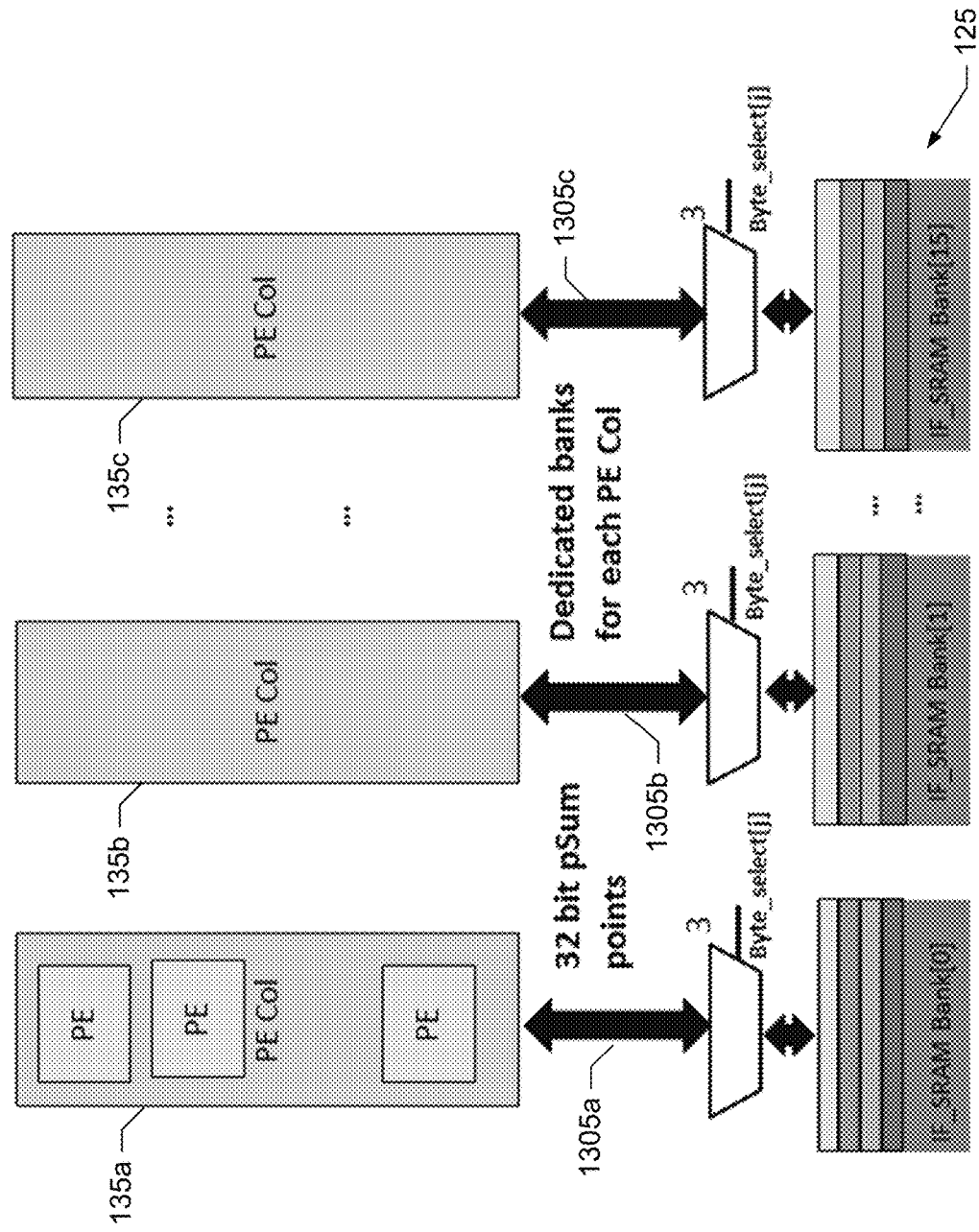
FIGS. 13A-B illustrate an example hardware architecture to support external partial sum accumulation in the configurable processor element array of FIG. 1.
Figure 13B:
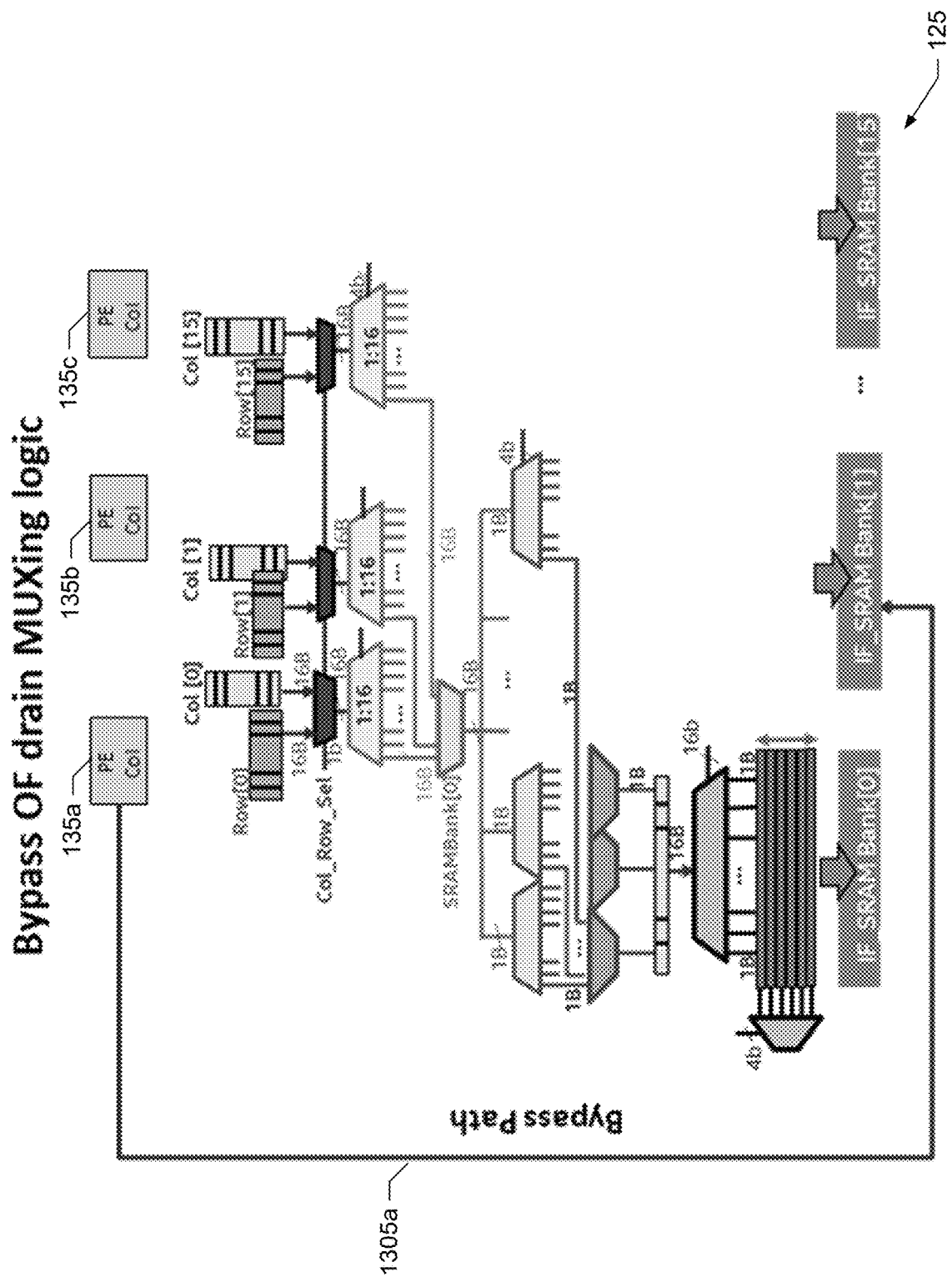

Example hardware architecture to support external partial sum accumulation in the example configurable processor element array 100 of FIG. 1 is illustrated in FIGS. 13A-B. In some dataflow schedules, the accumulation of the filtered input channels (Ic) of the IF tensor data is not completed in one processing iteration. Rather a part of an input channel is brought into the IF RF 145a of a given PE 105a-i and a computed partial sum is extracted out to the memory 125. That partial sum is then brought back into the OF RF 145c of the given PE 105a-i at a later point in time when the rest of the input channels have been accumulated. To preserve the accuracy of a final convolution result, the example configurable processor element array 100 does not perform truncation or ReLU on the partial sum data. For example, the partial sum data, which is the output of MAC unit 150 of the given PE 105a-i, is of 32-bit precision (or some other precision in other examples). During normal operation mode (e.g., not involving partial sums), the load and drain data path for each tensor data point is of 8-bit precision (or some other precision in other examples). To support the external partial sum accumulation, the configurable processor element array 100 includes example bypass data paths 1305a-c that support direct read and write access of the partial sum data between the column buffers 135a-c and the memory 125 at the original precision of the partial sum data, which is 32-bits in the illustrated example. Furthermore, in the illustrated example, the bypass data path for a given column buffer, such as the bypass data path 1305a for the column buffer 135a, splits the 32-bit wide data path into 1-byte chunks between the column buffer 1305a and the memory 125 by bypassing the OF drain multiplexing logic 1310 included between the column buffer 1305a and the memory 125.

Returning to the example of FIG. 1, although the input IF and FL tensor data are 8-bit precision (or some other precision in other examples), the output of MAC within a PE is 32-bit precision (or some other larger precision in other examples) to account for accumulation and prevention of accuracy loss. However, as the OF tensor data generated by a given neural network layer (L) serves as the IF tensor data for the subsequent neural network layer (L+1), the configurable processor element array 100 includes the example output data processors 138a-cassociated with the corresponding column buffers 135a-c to perform a truncation operation to adjust the bit precision of accumulated OF tensor data values to 8-bits before writing to the memory 125. Also, if a ReLU operation is to be performed by the given neural network layer, the output data processors 138a-c perform the ReLU operation, which results in the bit precision adjustment for generating the final OF tensor data. As such, the output data processors 138a-c apply either saturating truncation or ReLU to the 32-bit OF tensor data output from the corresponding column buffers 135a-c before writing the data to the SRAM buffers. The ReLU threshold employed by the output data processors 138a-c is also adjustable via the "ReluThreshold" descriptor of Table 1.

Figure 14:
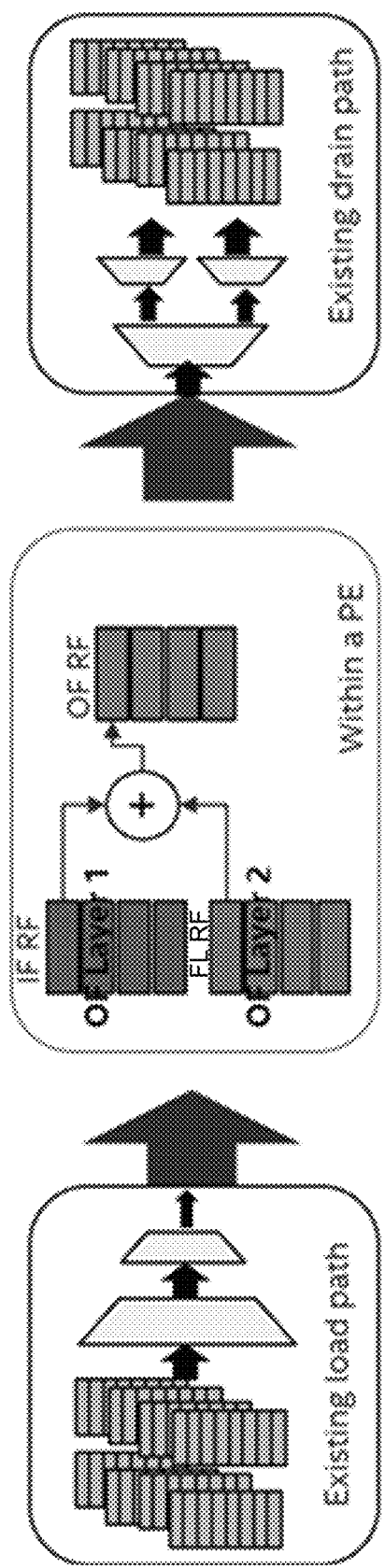
FIG. 14 illustrates an example hardware architecture to support elementwise operations in the configurable processor element array of FIG. 1.

Example hardware architecture to support elementwise operations in the example configurable processor element array 100 of FIG. 1 is illustrated in FIG. 14. Some residual neural networks, such as ResNet, employ elementwise operations, such as addition of OF tensor data elements from two convolutional layers of the neural network. To support elementwise operations while taking advantage hardware resource reuse, the configurable processor element array 100 routes the OF tensor data elements of two different layers into a given one of the PEs 105a-i by reusing the existing load path and drain path. For example, the configurable processor element array 100 routes the OF tensor data from the first one of the layers into the IF RF 145a of the given PE 105a-i and routes the OF tensor data from the second one of the layers into the FL RF 145b of the given PE 105a-i. Thus, the IF and FL RFs 145a-b will contain the OF tensor data from two separate layers. The "Eltwise" programmable descriptor field in Table 1 is set to "True" to indicate elementwise operation is activated, and an eltwise enable signal is used to bypass the MAC operation within the given PE 105a-i, which instead perform an elementwise operation (e.g., addition or max) of the first OF tensor data stored in the IF RF 145a and the second OF tensor data stored in the FL RF 145b.

Figure 15:
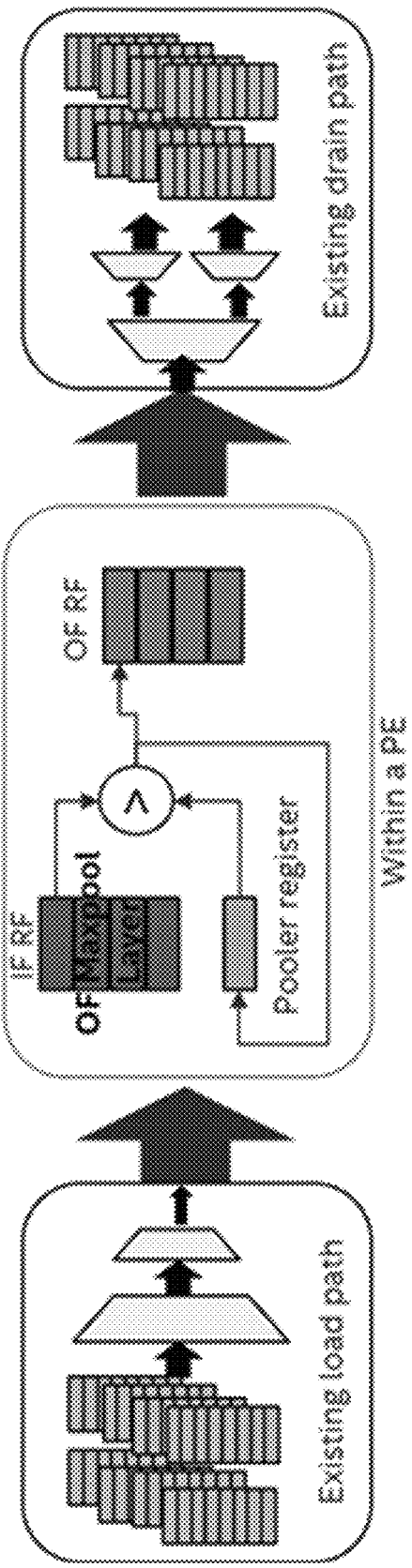
FIG. 15 illustrates an example hardware architecture to support maxpool operations in the configurable processor element array of FIG. 1.

Example hardware architecture to support maxpool operations in the example configurable processor element array 100 of FIG. 1 is illustrated in FIG. 15. The maxpool operation is widely used in many deep neural networks (DNNs) to prune the size of generated feature maps. To support the maxpool operation, the configurable processor element array 100 also reuses the load and drain paths to cause the OF data of the network layer that is to be maxpooled to be stored in the IF RF 145a of the given PE 105a-i. The pooler register 165 of the given PE 105a-i is used to keep track of the current maximum value against which subsequent OF points of the layer to be maxpooled are to be compared.

FIGS. 16-25 illustrates example use cases in which the configurable processor element array 100 is configured to operate according to four (4) different dataflow schedules to implement layers of a residual neural network, such as ResNet. FIGS. 16-19 illustrate respective example pseudocode representative of the different dataflow schedules implemented by the configurable processor element array 100 in these examples. As described in further detail below, the four (4) different dataflow schedules illustrated in these examples are based on a corresponding four (4) different tensor processing templates. In the following examples, the array of PEs 105a-i included in the configurable processor element array 100 is assumed to be N×N=16×16, which is 256 PEs 105a-i in total. However, these and other example use cases can be implemented with arrays of PEs 105a-i having different dimensions.

Figure 16:
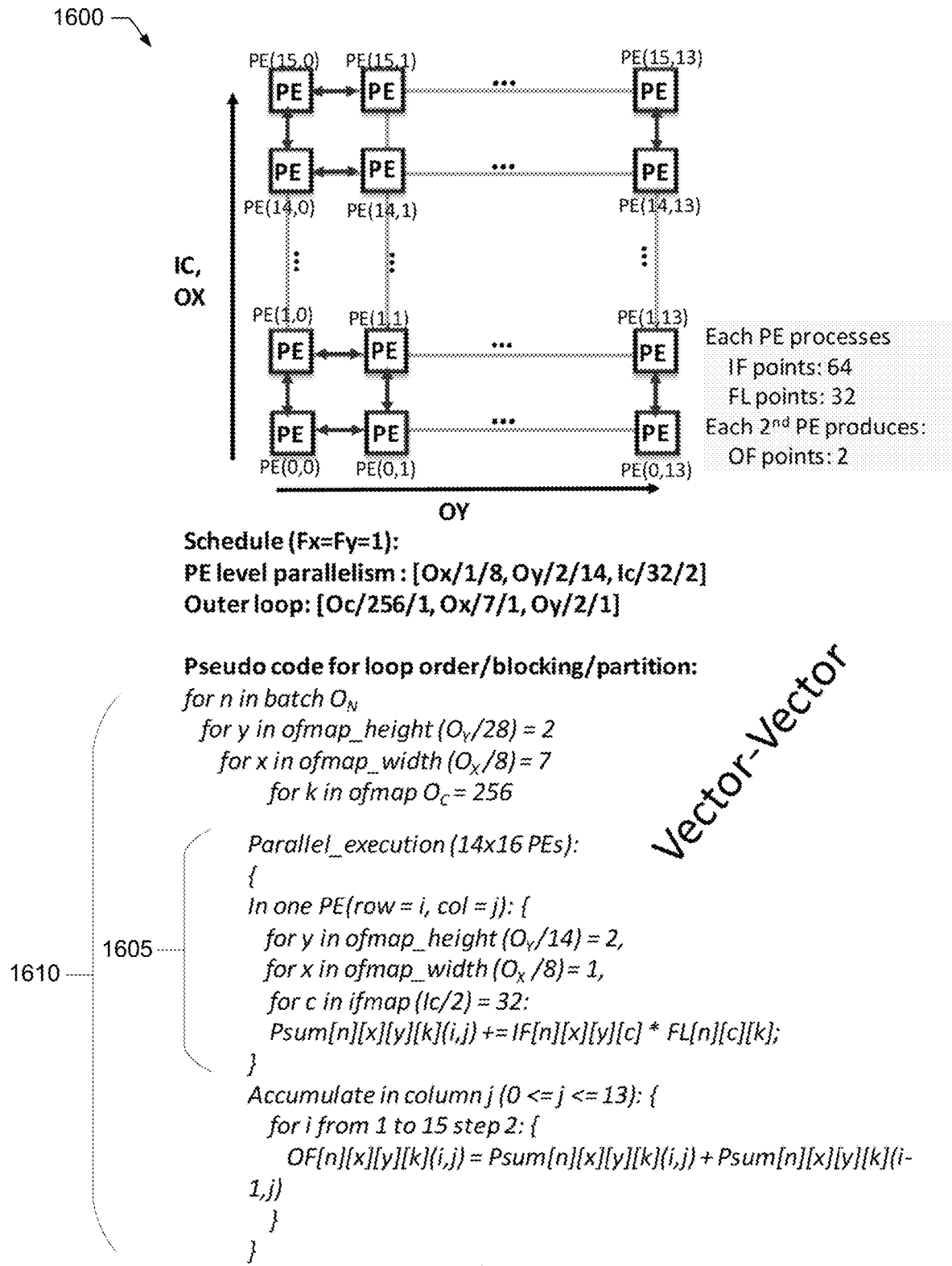

FIG. 16 illustrates example pseudocode for a first example dataflow schedule 1600 that is to process IF tensor data and FL tensor data to produce OF tensor data for an example layer of a residual neural network. In the illustrated example of FIG. 16, the volume of IF tensor data to be processed has 56 elements in the Ix dimension, 56 elements in the Iy dimension, and 64 elements in the Ic dimension, and the volume of OF tensor data to be produced has 56 elements in the Ox dimension, 56 elements in the Oy and 256 elements in the Oc dimension corresponding to 256 different filters (FL data) to be applied to the IF tensor data. The example dataflow schedule includes an example inner processing loop 1605 that maps 8 partitions of 1-element Ox data and 2 partitions of 32-element Ic data to 16 rows 110 a-c of the array of PEs 105a-i, and maps 14 partitions of 2-element Oy data to 14 columns 115a-c of the array of PEs 105a-i, respectively. Thus, each PE 105a-i in the 16×14 portion of the array of PEs 105a-i takes one (1) point of Ox, 2 points of Oy and 32 input channel (Ic) points, and generates partial sums for two (2) OF points belonging to one (1) output channel (Oc). Therefore, each PE 105a-i processes 64 IF points for 32 different Ic, and 32 FL points for 32 different Ic while producing two (2) different OF points belonging to single Oc. Note that since the Ic partitioning factor is two (2) along the PE columns 115a-c, this means that two (2) PEs in adjacent rows 110 a-c are working on producing the final OF point at that position in the OF output data volume. Thus, internal accumulation of the partial sums across the two (2) PEs 105a-i in the neighboring rows 110 a-c is used to generate the final OF point at that position in the OF output data. This results in eight (8) PEs producing final OF points within a given column 115a-c of the array of PEs 105a-i, and 112 PEs 106a-i in total (8 per column×14 columns) that are producing the final OF points resulting from the inner processing loop 605. Thus, the inner loop 1605 produces and OF data volume having eight (8) elements in the Ox dimension, 28 elements in the Oy dimension and one (1) element in the Oc dimension. The example dataflow schedule includes an example outer processing loop 1610 that performs 256 iterations in the Oc dimension, seven (7) iterations in the Ox dimension, and two (2) iterations in the Oy dimensions, which yields the final OF data volume of 56×56×256 OF points. Since IF data is reused by the outer loop 1610, the dataflow 1600 is input activation stationary. Since the dataflow accumulates Ic data elements over the same Oc dimension, the dataflow 1600 corresponds to the vector-vector tensor processing template.

Figure 20:
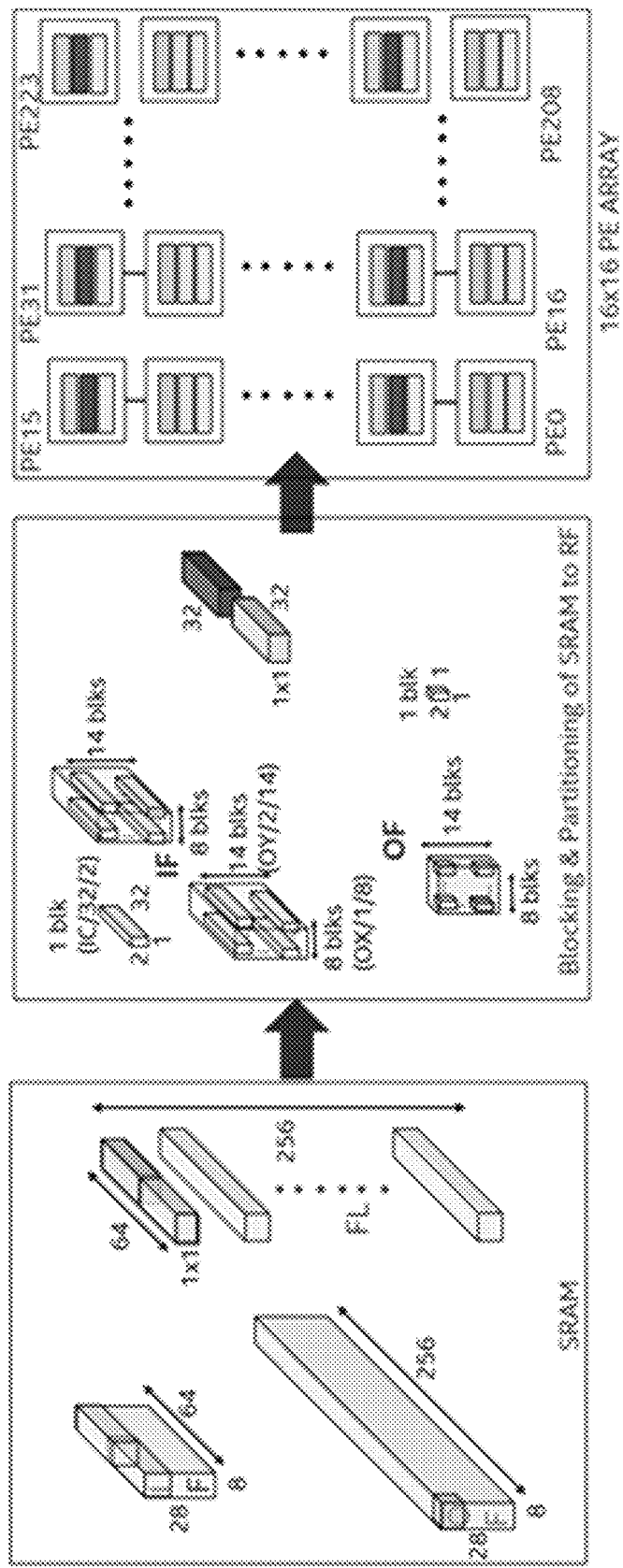
FIGS. 20-21 illustrate example data partitioning and blocking operations aspects of the first example dataflow schedule of FIG. 16.
Figure 21:
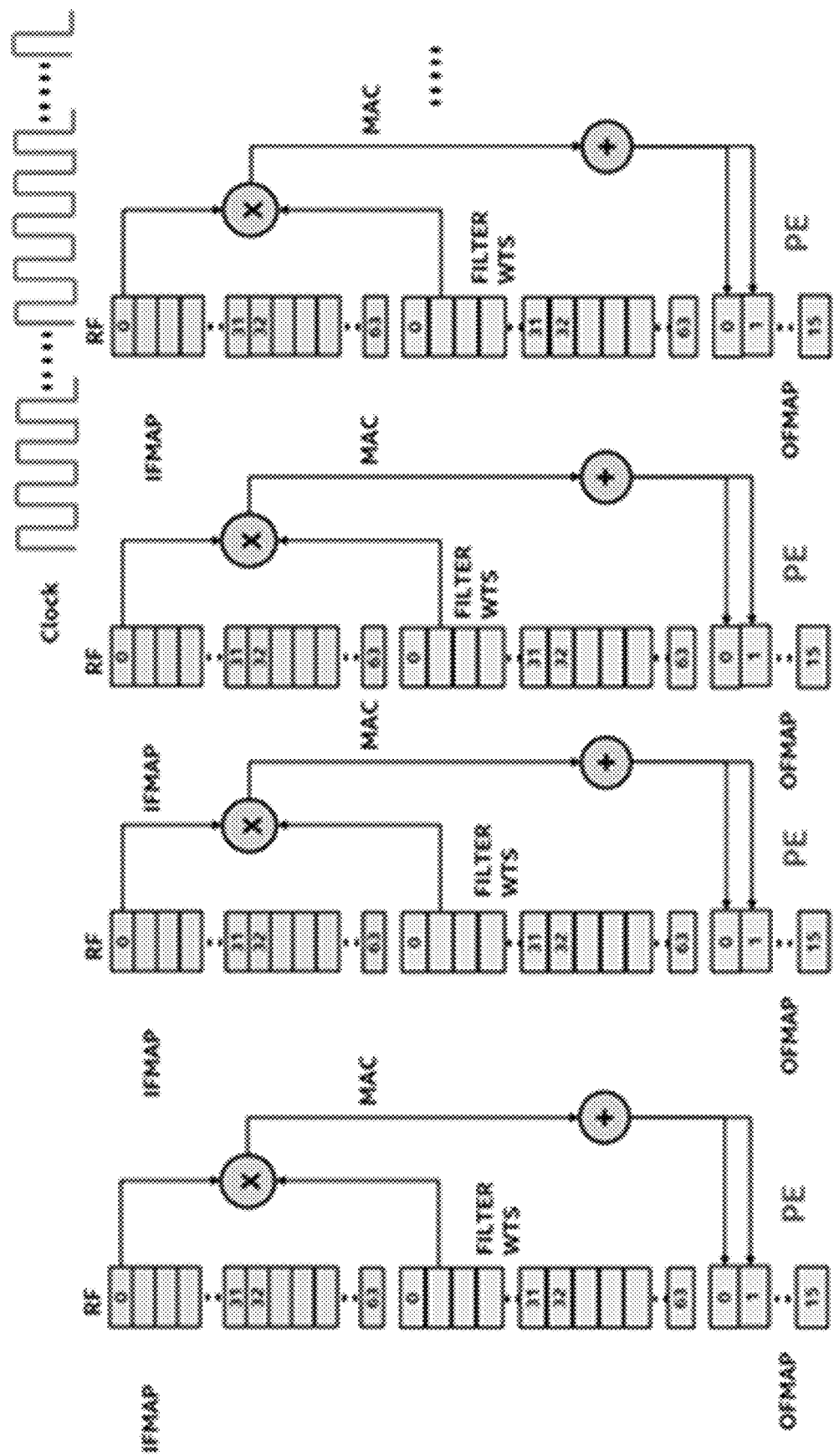

Example data partitioning and blocking aspects of the example dataflow schedule 1600 of FIG. 16 are depicted visually in FIG. 20. Example convolution operations performed by the array of PEs 105a-i to implement the example dataflow schedule 1600 of FIG. 16 are depicted visually in FIG. 21. FIG. 22 illustrates example values of the configuration descriptors of Table 1 that can be used to configure the example configurable processor element array 100 to implement the example dataflow schedule 1600 of FIG. 16.

Figure 17:
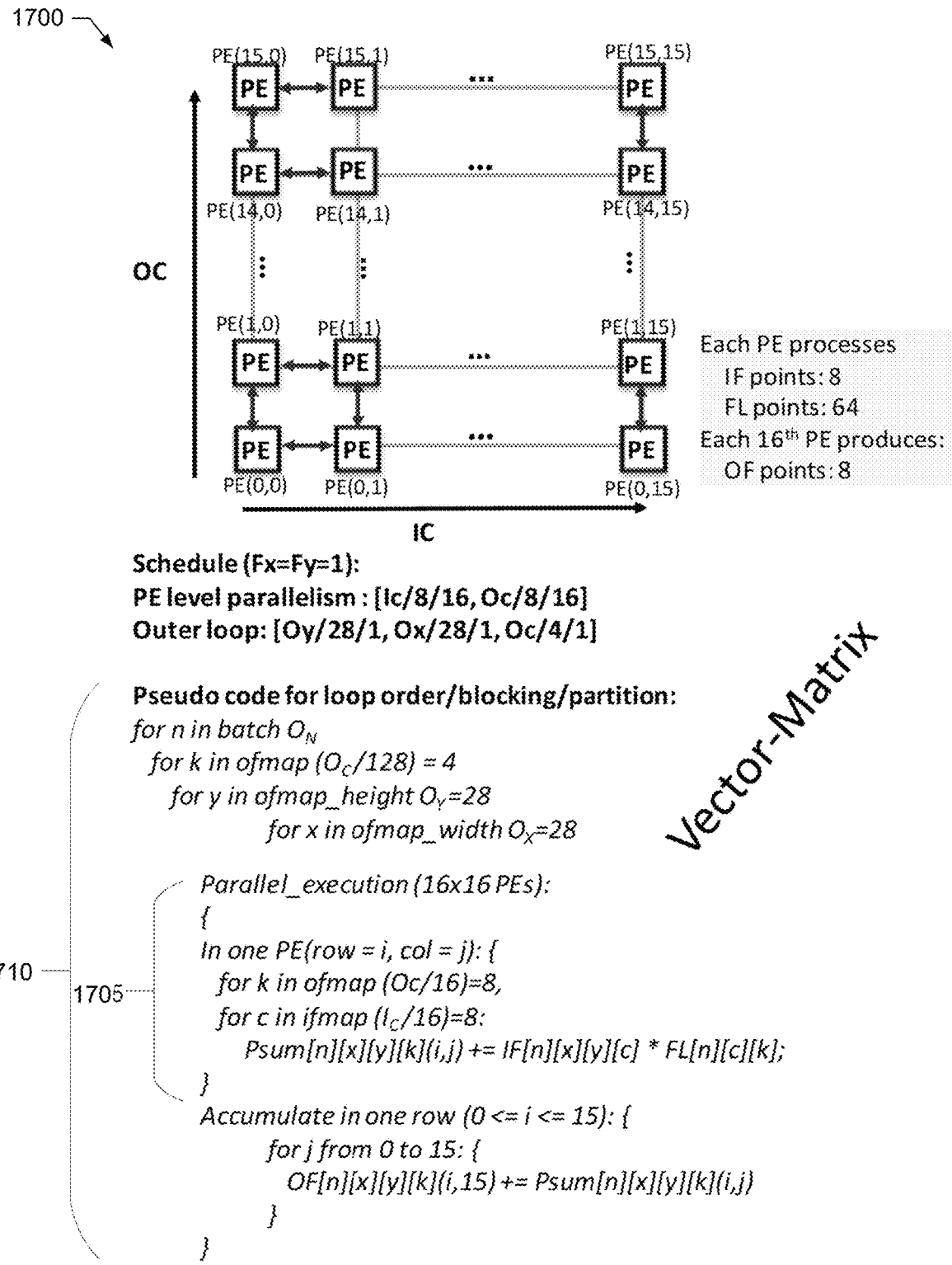

FIG. 17 illustrates example pseudocode for a second example dataflow schedule 1700 that is to process IF tensor data and FL tensor data to produce OF tensor data for an example layer of a residual neural network. In the illustrated example of FIG. 17, the volume of IF tensor data to be processed has 28 elements in the Ix dimension, 28 elements in the Iy dimension, and 128 elements in the Ic dimension, and the volume of OF tensor data to be produced has 28 elements in the Ox dimension, 28 elements in the Oy dimension and 512 elements in the Oc dimension corresponding to 512 different filters (FL data) to be applied to the IF tensor data. The example dataflow schedule 1700 includes an example inner processing loop 1705 that maps 16 partitions of 8-element Oc data and 16 partitions of 8-element Ic data to 16 rows 110 *a-c* and 16 columns 115*a-c* of the array of PEs 105*a-i*, respectively. Each PE 105*a-i* takes eight (8) input channel (Ic) points and eight (8) output channel (Oc) points to generate eight (8) OF data points. Therefore, each PE 105*a-i* operates on eight (8) IF data points for eight (8) different Ic, and 64 FL points to be applied to eight (8) different Ic data points to produce eight (8) different Oc data points. Thus, the inner loop 1705 produces and OF data volume having one (1) element in the Ox dimension, one (1) element in the Oy dimension and 8×16=128 elements in the Oc dimension. The example dataflow schedule includes an example outer processing loop 1710 that performs 28 iterations in the Ox dimension, 28 iterations in the Oy dimension and four (4) iterations in the Oc dimension. Since 16 partitions of Ic data map to the 16 columns 115*a-c*, the final OF data is determined by accumulation along the PE row direction (e.g., PE(i, 15) for i=0 to 15), and the OF data extraction is from the last PE column 115*c*. Since FL data is reused by the outer loop iterations over the Oy and Ox dimensions, the example dataflow schedule 1700 is weight stationary. Moreover, as the dataflow 1700 accumulates IC data across different OC dimensions, the dataflow 1700 corresponds to the vector-matrix tensor processing template. FIG. 23 illustrates example values of the configuration descriptors of Table 1 that can be used to configure the example configurable processor element array 100 to implement the example dataflow schedule 1700 of FIG. 17.

Figure 18:
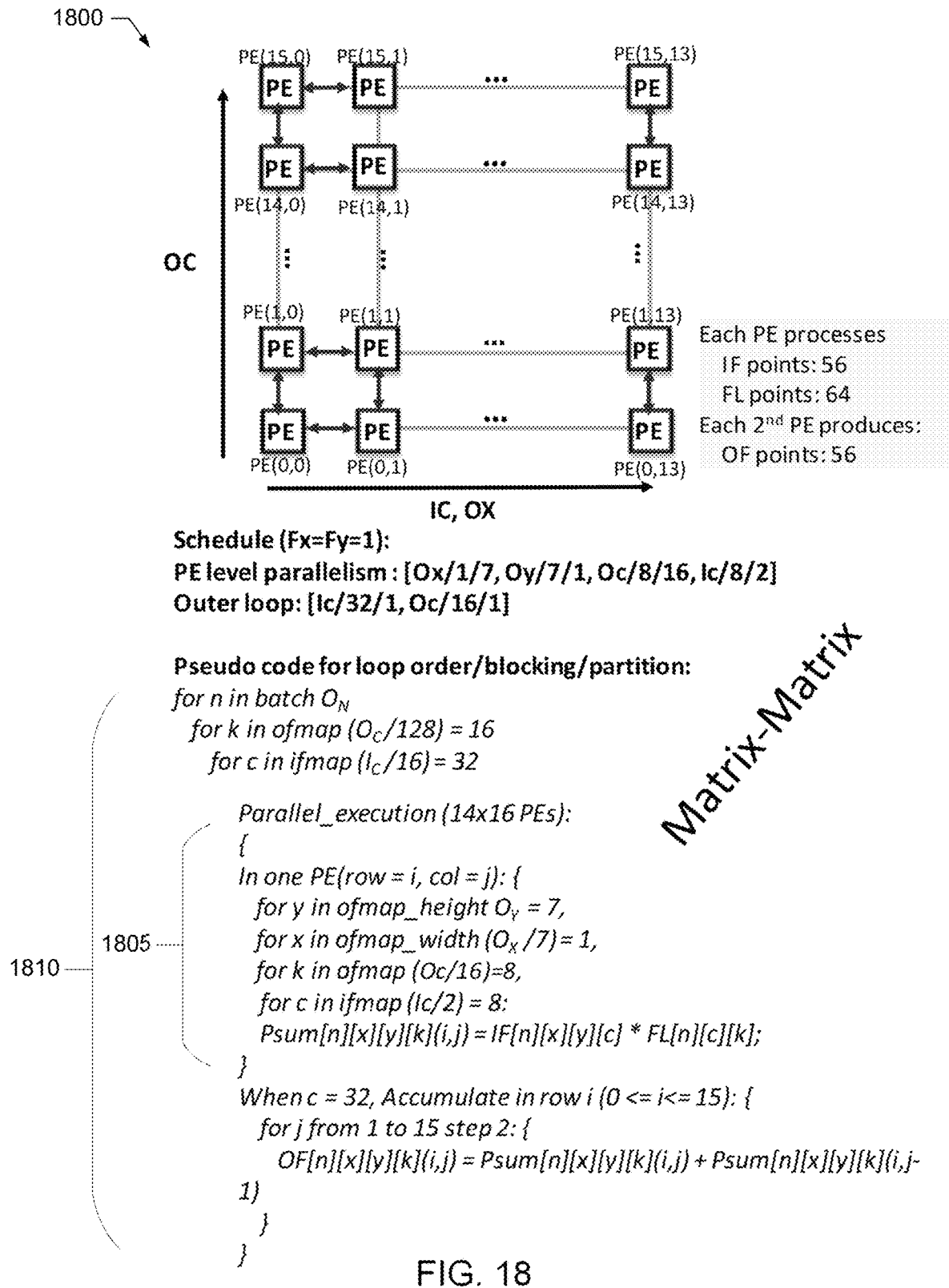

FIG. 18 illustrates example pseudocode for a third example dataflow schedule 1800 that is to process IF tensor data and FL tensor data to produce OF tensor data for an example layer of a residual neural network. The example dataflow 1800 includes an example inner processing loop 1805 that maps two (2) partitions of 8-element Ic data and eight (8) partitions of 1-element Ox data along the columns 115*a-c* of the array of PEs 105*a-i*, and maps 16 partitions of 8-element Oc data along 16 rows 110 *a-c* of the array of PEs 105*a-i*. Thus, each PE works on an 1×7×8 volume of OF data by processing a 7×8 volume of IF data and an 8×8 volume FL points to generate 56 partial sum OF data points. The example dataflow 1800 also includes an example outer processing loop 1810 in which, after each interval of 32 iterations of the Ic dimension, the partial sums in two (2) adjacent PEs 105*a-i* along the horizontal direction are internally accumulated to generate a final OF data point. Since at each iteration new IF and FL data points are brought into the PEs 105*a-i* (Ic in outer loop), and the partial sums are stationary within the PEs 105*a-i*, the dataflow schedule 1800 is output activation stationary. Also, as the dataflow 1800 performs accumulation over IC data points of different Ox dimensions and different OCs dimensions, the dataflow 1800 corresponds to the matrix-matrix tensor processing template. FIG. 24 illustrates example values of the configuration descriptors of Table 1 that can be used to configure the example configurable processor element array 100 to implement the example dataflow schedule 1800 of FIG. 18.

FIG. 19 illustrates example pseudocode for a fourth example dataflow schedule 1900 that is to process IF tensor data and FL tensor data to produce OF tensor data for an example layer of a residual neural network. The dataflow schedule 1900 is tailored for a neural network layer that employs a 3×3 filter (whereas the other example dataflows 1600-1800 correspond to neural network layers that employ 1×1 filters). The example dataflow 1900 includes an example inner processing loop 1905 that maps 14 partitions of 4-element Oy data along the columns 115*a-c* of the array of PEs 105*a-i* and maps eight (8) partitions of 1-element Ox data and two (2) partitions of 16-element Oc data along the rows 110 *a-c* of the array of PEs 105*a-i*. Thus, each PE 105*a-i* works on a 1×4×16 volume of OF data, and consumes 18 IF data points (because the weight dimension is 3×3, producing a 1×4 volume of OF data involves a 3×6 volume of IF data, corresponding to 18 IF points), and 16 FL data points to produce 64 partial sums. The example dataflow 1900 also includes an example outer processing loop 1910 in which, when all of nine (9) FL data points (corresponding to the 3×3 filter) and the 64 Ic data points have been accumulated within a given PE 105*a-i*, the final OF points are generated. Since Ic exists in the outer processing loop 1910, the dataflow schedule 1900 is an example of output activation stationary schedule. Also, as the dataflow 1900 brings in the filter points one after the other, and each computation involves multiplying a scalar (the filter) with multiple input activation points, the dataflow 1900 corresponds to the scalar-vector tensor processing template. FIG. 25 illustrates example values of the configuration descriptors of Table 1 that can be used to configure the example configurable processor element array 100 to implement the example dataflow schedule 1900 of FIG. 19.

While an example manner of implementing the configurable processor element array 100 is illustrated in FIGS. 1-25, one or more of the elements, processes and/or devices illustrated in FIGS. 1-25 may be combined, divided, re-arranged, omitted, eliminated and/or implemented in any other way. Further, the example PEs 105*a-i*, the example configuration register(s) 120, the example memory 125, the example tensor data distribution unit 130, the example column buffer storage 135*a-c*, the example output data processors 138*a-c*, the example buses 140*a-c*, the example RF storage 145*a-c*, the example MAC unit 150, the example elementwise computation unit 155, the example max-pooling unit 160, the example pooler register 165, the example configuration registers(s) 170, the example FSM 175, the example shared computation logic 605, the example multiplier 610, the example adder 615, the example comparator 620, the example multiplexer control logic 625-660, the example register 675 and/or, more generally, the example configurable processor element array 100 of FIGS. 1-25 may be implemented by hardware, software, firmware and/or any combination of hardware, software and/or firmware. Thus, for example, any of the example PEs 105*a-i*, the example configuration register(s) 120, the example memory 125, the example tensor data distribution unit 130, the example column buffer storage 135*a-c*, the example output data processors 138*a-c*, the example buses 140*a-c*, the example RF storage 145*a-c*, the example MAC unit 150, the example elementwise computation unit 155, the example max-pooling unit 160, the example pooler register 165, the example configuration registers(s) 170, the example FSM 175, the example shared computation logic 605, the example multiplier 610, the example adder 615, the example comparator 620, the example multiplexer control logic 625-660, the example register 675 and/or, more generally, the example configurable processor element array 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate arrays (FPGAs) and/or field programmable logic device(s) (FPLD(s)). When reading any of the apparatus or system claims of this patent to cover a purely software and/or firmware implementation, at least one of the example configurable processor element array 100, the example PEs 105*a-i*, the example configuration register(s) 120, the example memory 125, the example tensor data distribution unit 130, the example column buffer storage 135*a-c*, the example output data processors 138*a-c*, the example buses 140*a-c*, the example RF storage 145*a-c*, the example MAC unit 150, the example elementwise computation unit 155, the example max-pooling unit 160, the example pooler register 165, the example configuration registers(s) 170, the example FSM 175, the example shared computation logic 605, the example multiplier 610, the example adder 615, the example comparator 620, the example multiplexer control logic 625-660 and/or the example register 675 is/are hereby expressly defined to include a non-transitory computer readable storage device or storage disk such as a memory, a digital versatile disk (DVD), a compact disk (CD), a Blu-ray disk, etc. including the software and/or firmware. Further still, the example configurable processor element array 100 may include one or more elements, processes and/or devices in addition to, or instead of, those illustrated in FIGS. 1-25, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 26:
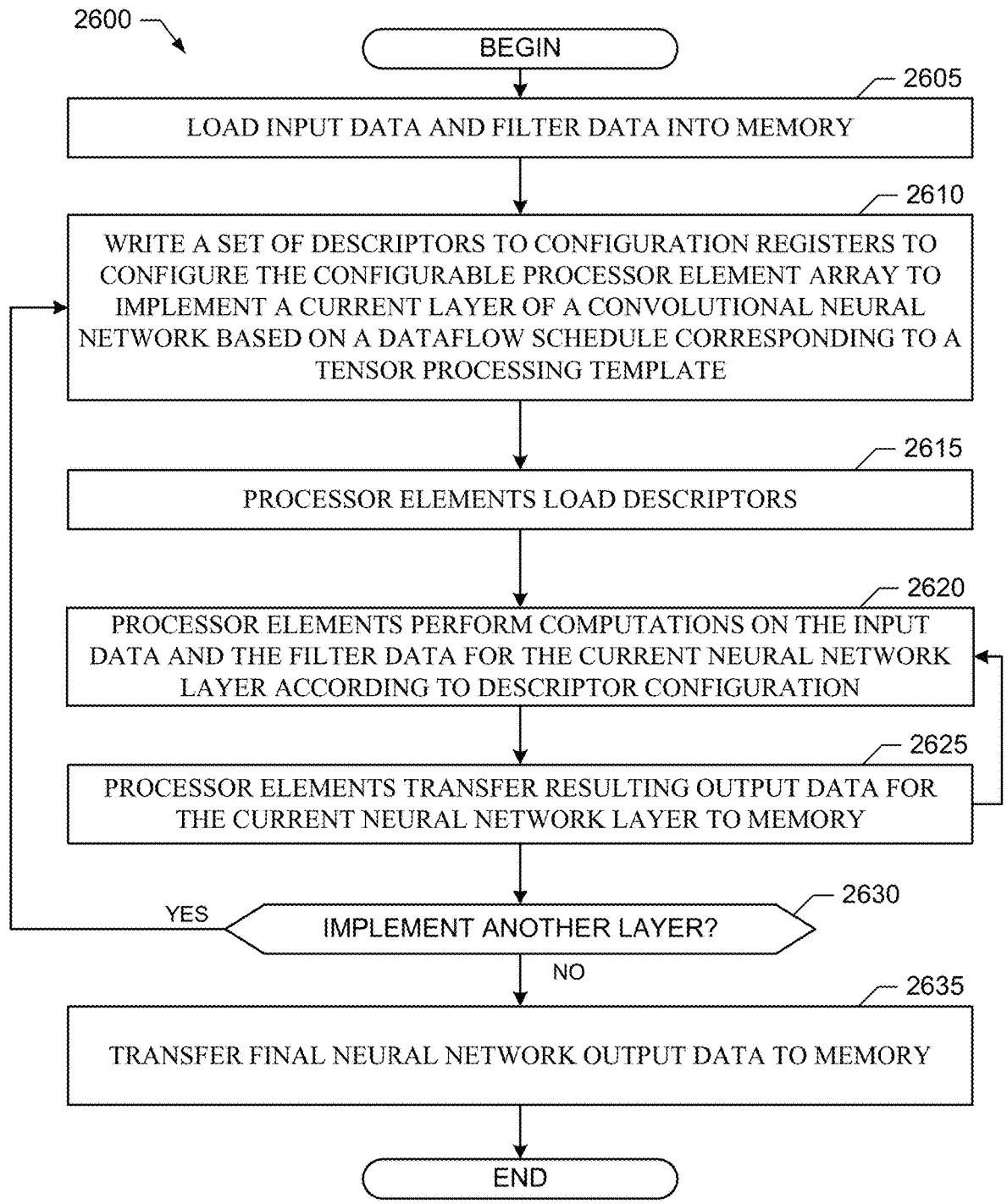
FIG. 26 is a flowchart representative of example computer readable instructions that may be executed to operate the configurable processor element array of FIGS. 1 and/or 6.

A flowchart representative of example hardware logic, machine readable instructions, hardware implemented state machines, and/or any combination thereof for implementing the example configurable processor element array 100 is shown in FIG. 26. In these examples, the machine readable instructions may be one or more executable programs or portion(s) of an executable program for execution by a computer processor, such as the processor 2712 shown in the example processor platform 2700 discussed below in connection with FIG. 27. The one or more programs, or portion(s) thereof, may be embodied in software stored on a non-transitory computer readable storage medium such as a CD-ROM, a floppy disk, a hard drive, a DVD, a Blu-Ray Disk™, or a memory associated with the processor 2712, but the entire program or programs and/or parts thereof could alternatively be executed by a device other than the processor 2712 and/or embodied in firmware or dedicated hardware. Further, although the example program(s) is(are) described with reference to the flowchart illustrated in FIG. 26, many other methods of implementing the example configurable processor element array 100 may alternatively be used. For example, with reference to the flowchart illustrated in FIG. 26, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example process of FIG. 26 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. Also, as used herein, the terms "computer readable" and "machine readable" are considered equivalent unless indicated otherwise.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

An example program 2600 that may be executed to operate the example configurable processor element array 100 of FIG. 1 to implement a layer of a convolutional neural network is represented by the flowchart shown in FIG. 26. With reference to the preceding figures and associated written descriptions, the example program 2600 of FIG. 26 begins execution at block 2605 at which the configuration loader 122 executes instructions (e.g., a compiler, software, etc.) to load input data (IF data) and filter data (FL data) corresponding to a convolutional neural network to be implemented by the configurable processor element array 100 into the memory 125 of the configurable processor element array 100. At block 2610, the configuration loader 122 executes instructions (e.g., a compiler, software, etc.) to write descriptors to the configuration registers 120 to configure the configurable processor element array 100 to implement a first layer of the convolutional neural network based on a given dataflow schedule corresponding to one the possible tensor processing templates, as described above. As such, block 2610 corresponds to an example of the configuration phase 705 described above. At block 2615, the PEs 105a-i of the configurable processor element array 100 load the descriptor values into the corresponding configuration registers 170 of the respective PEs 105a-i. As such, block 2615 corresponds to an example of the load phase 710 described above. At block 2620, the PEs 105a-i of the configurable processor element array 100 perform computation operations on the input data and filter data corresponding to the current neural network layer according to the configured descriptors, as described above. As described above, the computation operations performed at block 2620 can include, for example, MAC operations, elementwise operations, maxpool operations, internal partial sum accumulations, external partial sum accumulations, etc. As such, block 2620 corresponds to an example of the computation phase 715, the accumulation phase 720 and/or the external partial sum accumulation phase 725 described above. At block 2625, the PEs 105a-i store the output data (OF data) determined at block 2620 for the current neural network layer in the memory of the configurable processor element array 100, as described above. As such, block 2625 corresponds to an example of the retrieval phase 730 described above.

At block 2630, the configuration loader 122 executes instructions (e.g., a compiler, software, etc.) to determine whether another layer (e.g., a second layer) of the neural network is to be implemented. If another neural network layer is to be implemented ("Yes" at block 2640), control returns to block 2610 at which the configuration loader 122 executes instructions (e.g., a compiler, software, etc.) to write another set of descriptors to the configuration registers 120 to configure the configurable processor element array 100 to implement the next (e.g., second) layer of the convolutional neural network based on a given dataflow schedule corresponding to one the possible tensor processing templates, as described above. As described above, the tensor processing template and resulting associated dataflow schedule configured by the configuration loader 122 at block 2610 for the next (e.g., second) layer of the convolutional neural network can be the same as, or different from, the tensor processing template and resulting associated dataflow schedule configured during the previous iteration of block 2610 for the first layer of the convolutional neural network. Control then proceeds to block 2615 and subsequent blocks to implement the next (e.g., second) layer of the convolutional neural network.

However, if no other neural network layers are to be implemented ("No" at block 2630), then at block 2635 configurable processor element array 100 causes its PEs 105a-i to perform any final partial sum accumulations (see e.g. the example dataflow schedules 1600-1900 described above) and then writes the final output data (OF data) to the memory 125 of the configurable processor element array 100. The example program 2600 then ends.

Figure 27:
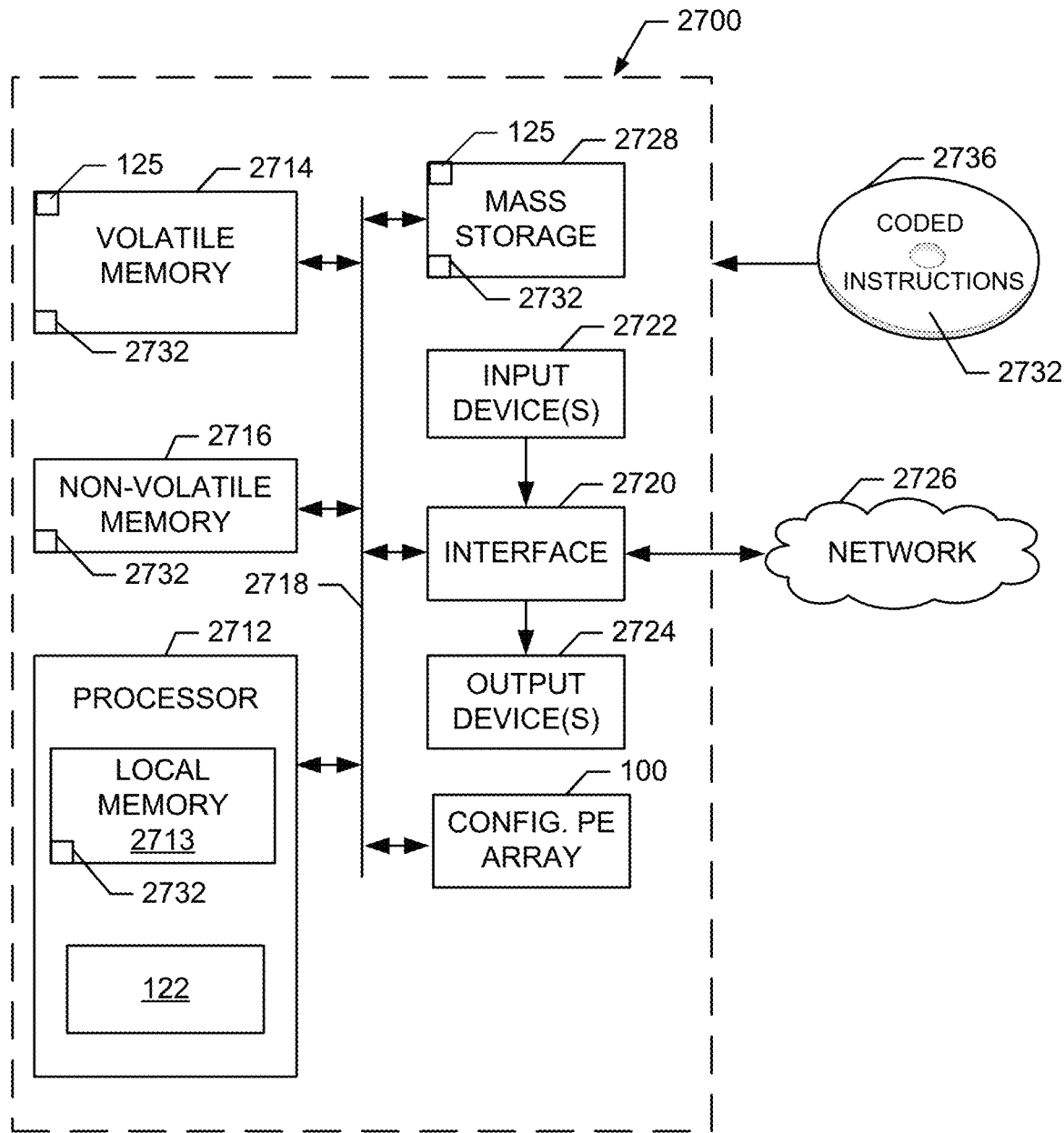
FIG. 27 is a block diagram of an example processor platform structured to include the example configurable processor element array of FIGS. 1 and/or 6 and to execute the example computer readable instructions of FIG. 26 to operate the configurable processor element array of FIGS. 1 and/or 6.

FIG. 27 is a block diagram of an example processor platform 2700 structured to execute the instructions of FIG. 26 to implement the configurable processor element array 100 of FIGS. 1-25. The processor platform 2700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 2700 of the illustrated example includes a processor 2712. The processor 2712 of the illustrated example is hardware. For example, the processor 2712 can be implemented by one or more integrated circuits, logic circuits, microprocessors, GPUs, DSPs, or controllers from any desired family or manufacturer. The hardware processor 2712 may be a semiconductor based (e.g., silicon based) device. In the illustrated example, the hardware processor 2712 implements the configuration loader 122 of FIG. 1.

The processor 2712 of the illustrated example includes a local memory 2713 (e.g., a cache). The processor 2712 of the illustrated example is in communication with a main memory including a volatile memory 2714 and a non-volatile memory 2716 via a link 2718. The link 2718 may be implemented by a bus, one or more point-to-point connections, etc., or a combination thereof. The volatile memory 2714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 2716 may be implemented by flash memory and/or any other desired type of memory device. Access to the main memory 2714, 2716 is controlled by a memory controller.

The processor platform 2700 of the illustrated example also includes an interface circuit 2720. The interface circuit 2720 may be implemented by any type of interface standard, such as an Ethernet interface, a universal serial bus (USB), a Bluetooth® interface, a near field communication (NFC) interface, and/or a PCI express interface.

In the illustrated example, one or more input devices 2722 are connected to the interface circuit 2720. The input device(s) 2722 permit(s) a user to enter data and/or commands into the processor 2712. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 2700, can allow the user to control the computer system and provide data to the computer using physical gestures, such as, but not limited to, hand or body movements, facial expressions, and face recognition.

The processor platform 2700 further includes the configurable processor element array 100, which is in communication with other elements of the processor platform 2700 via the link 2718. For example, the configurable processor element array 100 can obtain input IF data from one or more of the input devices 2722 via the interface circuit 2720, implement layers of a convolutional neural network to process the input IF data, as described above, and output the resulting OF data to the output devices 2724 via the interface circuit 2720.

One or more output devices 2724 are also connected to the interface circuit 2720 of the illustrated example. The output devices 2724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speakers(s). The interface circuit 2720 of the illustrated example, thus, typically includes a graphics driver card, a graphics driver chip and/or a graphics driver processor.

The interface circuit 2720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 2726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 2700 of the illustrated example also includes one or more mass storage devices 2728 for storing software and/or data. Examples of such mass storage devices 2728 include floppy disk drives, hard drive disks, compact disk drives, Blu-ray disk drives, redundant array of independent disks (RAID) systems, and digital versatile disk (DVD) drives. In some examples, the mass storage device(s) 2728 implements the memory 125 of the configurable processor element array 100. Additionally or alternatively, in some examples, the volatile memory 2714 implements the memory 125 of the configurable processor element array 100.

The machine executable instructions 2732 corresponding to the instructions of FIG. 2600 may be stored in the mass storage device 2728, in the volatile memory 2714, in the non-volatile memory 2716, in the local memory 2713 and/or on a removable non-transitory computer readable storage medium, such as a CD or DVD 2736.

From the foregoing, it will be appreciated that example configurable processor element arrays for implementing convolutional neural network have been disclosed. Disclosed configurable processor element arrays provide a low-cost programmable deep neural network (DNN) hardware solution that supports flexible dataflow schedule mappings in by virtue of mapping the dataflow for a given neural network layer into one of vector-vector, vector-matrix, matrix-matrix or scalar-vector macro instruction tensor processing templates. Disclosed configurable processor element arrays can provide flexibility similar to that of an FPGA while retaining the energy efficiency of an ASIC hardware accelerator. Also, disclosed configurable processor element arrays are not limited to particular register file or memory sizes or arrangements and, thus, can be employed in a wide range of machine learning accelerator designs. Moreover, disclosed configurable processor element arrays can used to develop DNN accelerators that exploit energy efficiency from data reuse. Disclosed configurable processor element arrays are accordingly directed to one or more improvement(s) in the functioning of computer technology.

The foregoing disclosure provides example solutions to implement convolutional neural networks with disclosed configurable processor element arrays. The following further examples, which include subject matter such as an apparatus to implement a convolutional neural network, a non-transitory computer readable medium including instructions that, when executed, cause at least one processor to configure an apparatus to implement a convolutional neural network, and a method to configure an apparatus to implement a convolutional neural network, are disclosed herein. The disclosed examples can be implemented individually and/or in one or more combinations.

Example 1 is an apparatus to implement a convolutional neural network. The apparatus of example 1 includes an array of processor elements, the array including rows and columns, respective ones of the rows having a first number of processor elements, respective ones of the columns having a second number of processor elements. The apparatus of example 1 also includes configuration registers to store a plurality of descriptors, the descriptors to configure the array of processor elements to implement a layer of the convolutional neural network based on a dataflow schedule corresponding to one of a plurality of tensor processing templates, ones of the processor elements to be configured based on the descriptors to implement the one of the plurality of tensor processing templates to operate on input activation data and filter data associated with the layer of the convolutional neural network to produce output activation data associated with the layer of the convolutional neural network. The apparatus of example 1 further includes memory to store the input activation data, the filter data and the output activation data associated with the layer of the convolutional neural network.

Example 2 includes the subject matter of example 1, wherein the layer is a first layer of the convolutional neural network, the plurality of descriptors is a first plurality of descriptors, the one of the plurality of tensor processing templates is a first one of the plurality of tensor processing templates, and the configuration registers are reconfigurable to store a second plurality of descriptors, the second plurality of descriptors to configure the array of processor elements to implement a second layer of the convolutional neural network based on a second dataflow schedule corresponding to a second one of the plurality of tensor processing templates, the second one of the plurality of tensor processing templates different from the first one of the plurality of tensor processing templates.

Example 3 includes the subject matter of example 2, wherein the plurality of tensor processing templates includes a vector-vector template, a vector-matrix template and a matrix-matrix template.

Example 4 includes the subject matter of any one of examples 1 to 3, wherein a first processor element of the array of processor elements includes: (i) an input activation register file to store first input activation data to be processed by the first processor element, (ii) a filter register file to store first filter data to be processed by the first processor element, (iii) an output activation register file to store first output activation data to be produced by the first processor element based on the first input activation data and the first filter data, and (iv) a finite state machine to control operation of the first processor element to implement the one of the plurality of tensor processing templates.

Example 5 includes the subject matter of example 4, wherein the configuration registers are first configuration registers, and the first processor element further includes second configuration registers to store at least some of the descriptors, the second configuration registers to configure the finite state machine.

Example 6 includes the subject matter of example 4, wherein the first processor element further includes: (i) a multiply-and-accumulate unit to perform multiplication and accumulation operations on the first input activation data and the first filter data, (ii) an elementwise computation unit to perform elementwise operations on the first input activation data, (iii) a maxpool unit to perform a maxpool operation to produce the first output activation data, and (iv) control logic configurable by the finite state machine to control operation of the multiply-and-accumulate unit, the elementwise operation unit and the maxpool unit.

Example 7 includes the subject matter of any one of examples 1 to 6, wherein the first number equals the second number.

Example 8 includes the subject matter of any one of examples 1 to 7, and further includes a processor to execute computer instructions to write the plurality of descriptors to the configuration registers.

Example 9 includes the subject matter of example 8, wherein the layer is a first layer of the convolutional neural network, the plurality of descriptors is a first plurality of descriptors, the one of the plurality of tensor processing templates is a first one of the plurality of tensor processing templates, and the processor is to write a second plurality of descriptors to the configuration registers, the second plurality of descriptors to configure the array of processor elements to implement a second layer of the convolutional neural network based on a second dataflow schedule corresponding to a second one of the plurality of tensor processing templates, the second one of the plurality of tensor processing templates different from the first one of the plurality of tensor processing templates.

Example 10 is a non-transitory computer readable medium comprising computer readable instructions which, when executed, cause at least one processor to at least: (i) write a first set of descriptors to configuration registers to configure an array of processor elements to implement a first layer of a convolutional neural network based on a first dataflow schedule corresponding to a first one of a plurality of tensor processing templates, the array including rows and columns, respective ones of the rows having a first number of processor elements, respective ones of the columns having a second number of processor elements, the first set of descriptors to configure ones of the processor elements to implement the first one of the plurality of tensor processing templates to operate on input activation data and filter data associated with the first layer of the convolutional neural network to produce output activation data associated with the first layer of the convolutional neural network, and (ii) write a second set of descriptors to the configuration registers to configure the array of processor elements to implement a second layer of a convolutional neural network based on a second dataflow schedule corresponding to a second one of the plurality of tensor processing templates, the second set of descriptors to configure the ones of the processor elements to implement the second one of the plurality of tensor processing templates to operate on input activation data and filter data associated with the second layer of the convolutional neural network to produce output activation data associated with the second layer of the convolutional neural network.

Example 11 includes the subject matter of example 10, wherein the second one of the plurality of tensor processing templates is different from the first one of the plurality of tensor processing templates.

Example 12 includes the subject matter of example 11, wherein the plurality of tensor processing templates includes a vector-vector template, a vector-matrix template and a matrix-matrix template.

Example 13 includes the subject matter of any one of examples 10 to 12, wherein the instructions, when executed, further cause the at least one processor to write a third set of descriptors to the configuration registers to configure the array of processor elements to implement a third layer of a convolutional neural network, the third set of descriptors to configure the ones of the processor elements to perform at least one of elementwise operations or a maxpool operations.

Example 14 includes the subject matter of examples 10 to 13, wherein the first number equals the second number.

Example 15 is a method to implement a convolutional neural network. The method of example 15 includes writing, by executing an instruction with at least one processor, a first set of descriptors to configuration registers to configure an array of processor elements to implement a first layer of a convolutional neural network based on a first dataflow schedule corresponding to a first one of a plurality of tensor processing templates, the array including rows and columns, respective ones of the rows having a first number of processor elements, respective ones of the columns having a second number of processor elements, the first set of descriptors to configure ones of the processor elements to implement the first one of the plurality of tensor processing templates to operate on input activation data and filter data associated with the first layer of the convolutional neural network to produce output activation data associated with the first layer of the convolutional neural network. The method of example 15 also includes writing, by executing an instruction with at least one processor, a second set of descriptors to the configuration registers to configure the array of processor elements to implement a second layer of a convolutional neural network based on a second dataflow schedule corresponding to a second one of the plurality of tensor processing templates, the second set of descriptors to configure the ones of the processor elements to implement the second one of the plurality of tensor processing templates to operate on input activation data and filter data associated with the second layer of the convolutional neural network to produce output activation data associated with the second layer of the convolutional neural network.

Example 16 includes the subject matter of example 15, wherein the second one of the plurality of tensor processing templates is different from the first one of the plurality of tensor processing templates.

Example 17 includes the subject matter of example 16, wherein the plurality of tensor processing templates includes a vector-vector template, a vector-matrix template and a matrix-matrix template.

Example 18 includes the subject matter of any one of examples 15 to 17, and further includes writing a third set of descriptors to the configuration registers to configure the array of processor elements to implement a third layer of a convolutional neural network, the third set of descriptors to configure the ones of the processor elements to perform at least one of elementwise operations or a maxpool operations.

Example 19 includes the subject matter of any one of examples 15 to 18, wherein the first number equals the second number.

Example 20 is an apparatus to implement a convolutional neural network. The apparatus of example 20 includes an array of processor elements, the array including rows and columns, respective ones of the rows having a first number of processor elements, respective ones of the columns having a second number of processor elements. The apparatus of example 20 also includes means for configuring the array of processor elements based on a plurality of descriptors to implement a layer of the convolutional neural network based on a dataflow schedule corresponding to one of a plurality of tensor processing templates, the descriptors to configure ones of the processor elements to implement the one of the plurality of tensor processing templates to operate on input activation data and filter data associated with the layer of the convolutional neural network to produce output activation data associated with the layer of the convolutional neural network. The apparatus of example 20 further includes means for storing the input activation data, the filter data and the output activation data associated with the layer of the convolutional neural network.

Example 21 includes the subject matter of example 20, wherein the layer is a first layer of the convolutional neural network, the plurality of descriptors is a first plurality of descriptors, the one of the plurality of tensor processing templates is a first one of the plurality of tensor processing templates, and the configuration means is to configure the array of processor elements based on a second plurality of descriptors to implement a second layer of the convolutional neural network based on a second dataflow schedule corresponding to a second one of the plurality of tensor processing templates, the second one of the plurality of tensor processing templates different from the first one of the plurality of tensor processing templates.

Example 22 includes the subject matter of example 21, wherein the plurality of tensor processing templates includes a vector-vector template, a vector-matrix template and a matrix-matrix template.

Example 23 includes the subject matter of any one of examples 20 to 22, wherein the first number equals the second number.

Example 24 includes the subject matter of any one of examples 20 to 23, and further includes means for loading the plurality of descriptors into the means for configuring the array of processor elements.

Example 25 includes the subject matter of example 24, wherein the layer is a first layer of the convolutional neural network, the plurality of descriptors is a first plurality of descriptors, the one of the plurality of tensor processing templates is a first one of the plurality of tensor processing templates, and the means loading is to load a second plurality of descriptors into the means for configuring to configure the array of processor elements to implement a second layer of the convolutional neural network based on a second dataflow schedule corresponding to a second one of the plurality of tensor processing templates, the second one of the plurality of tensor processing templates different from the first one of the plurality of tensor processing templates.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to implement a convolutional neural network, the apparatus comprising:
   an array of processor circuits to perform convolutions having tensors of different shapes;
   configuration registers to store a plurality of descriptors, the descriptors to configure the array of processor circuits to decompose different ones of the convolutions into operations with different tensor processing templates, the different tensor processing templates comprising a vector-vector template, a vector-matrix template, and a matrix-matrix template; and
   memory to store the tensors of different shapes,
   wherein:
   a tensor processing template for a convolution is to be used to partition an input activation tensor of the convolution into input subtensors and to partition a weight tensor of the convolution into weight subtensors, the input activation tensor including activations, each of the input subtensors being a vector or matrix that includes a subset of the activations of the input activation tensor, the weight tensor including weights, each weight subtensor being a vector or matrix that includes a subset of the weights of the weight tensor,
    the processor circuits is to perform the convolution by performing a plurality of operations on the input subtensors and the weight subtensors, and
    an operation of the plurality of operations is to be performed on one of the input subtensor and one of the weight subtensors.

2. The apparatus of claim 1, wherein the plurality of descriptors comprises a first plurality of descriptors to configure the array of processor circuits to implement a first layer of the convolutional neural network using the tensor processing template, and the configuration registers are reconfigurable to store a second plurality of descriptors, the second plurality of descriptors to configure the array of processor circuits to implement a second layer of the convolutional neural network using a different tensor processing template.

3. The apparatus of claim 1, wherein a first processor circuit of the array of processor circuits includes:
    input activation register file storage to store first input activation data to be processed by the first processor circuit;
    filter register file storage to store first filter data to be processed by the first processor circuit;
    output activation register file storage to store first output activation data to be produced by the first processor circuit based on the first input activation data and the first filter data; and
    a finite state machine to control operation of the first processor circuit to implement the at least one of the plurality of tensor processing templates.

4. The apparatus of claim 3, wherein the configuration registers are first configuration registers, and the first processor circuit further includes second configuration registers to store at least one of the descriptors, the second configuration registers to configure the finite state machine.

5. The apparatus of claim 3, wherein the first processor circuit further includes:
    a multiply-and-accumulate circuit to perform multiplication and accumulation operations on the first input activation data and the first filter data;
    an elementwise computation circuit to perform elementwise operations on the first input activation data;
    a maxpool circuit to perform a maxpool operation to produce the first output activation data; and
    control logic configurable by the finite state machine to control operation of the multiply-and-accumulate circuit, the elementwise computation circuit and the maxpool circuit.

6. The apparatus of claim 1, further comprising:
    a buffer circuit to perform at least one of a truncation operation or a rectified linear unit operation to modify an output of the array of processor circuits.

7. The apparatus of claim 1, further including a compute device to be programmed by computer instructions to write the plurality of descriptors to the configuration registers.

8. The apparatus of claim 7, wherein the layer is a first layer of the convolutional neural network, the plurality of descriptors is a first plurality of descriptors, the at least one of the plurality of tensor processing templates includes a first one of the different tensor processing templates, and the compute device is to write a second plurality of descriptors to the configuration registers, the second plurality of descriptors to configure the array of processor circuits to implement a second layer of the convolutional neural network based on at least a second one of the different tensor processing templates.

9. A non-transitory computer readable medium comprising computer readable instructions to cause at least one compute device to at least:
    write a first set of descriptors to configuration registers to configure an array of processor circuits to implement a first layer of a convolutional neural network based on a first one of a plurality of tensor processing templates; and
    write a second set of descriptors to the configuration registers to configure the array of processor circuits to implement a second layer of a convolutional neural network based on a second one of the plurality of tensor processing templates,
    wherein:
        the plurality of tensor processing templates comprising a vector-vector template, a vector-matrix template, and a matrix-matrix template,
        the first layer and the second layer have convolutions with tensors of different shapes,
        a tensor processing template for a convolution is to be used to partition an input activation tensor of the convolution into input subtensors and to partition a weight tensor of the convolution into weight subtensors, the input activation tensor including activations, each of the input subtensors being a vector or matrix that includes a subset of the activations of the input activation tensor, the weight tensor including weights, each weight subtensor being a vector or matrix that includes a subset of the weights of the weight tensor,
        the processor circuits is to perform the convolution by performing a plurality of operations on the input subtensors and the weight subtensors, and
        an operation of the plurality of operations is to be performed on one of the input subtensor and one of the weight subtensors.

10. The non-transitory computer readable medium of claim 9, wherein the second one of the plurality of tensor processing templates is different from the first one of the plurality of tensor processing templates.

11. A non-transitory computer readable medium of claim 9,
    wherein the instructions are to cause the at least one compute device to write a third set of descriptors to the configuration registers to configure the array of processor circuits to implement a third layer of a convolutional neural network, the third set of descriptors to configure the processor circuits to perform at least one of elementwise operations or maxpool operations.

12. The non-transitory computer readable medium of claim 9, wherein the array includes rows and columns, a row includes a first number of processor circuits, a column includes a second number of processor circuits, and the first number equals the second number.

13. A method to implement a convolutional neural network, the method comprising:
    writing a first set of descriptors to configuration registers to configure an array of processor circuits to implement a first layer of a convolutional neural network based on a first one of a plurality of tensor processing templates; and writing a second set of descriptors to the configuration registers to configure the array of processor circuits to implement a second layer of a convolutional neural network based on a second one of the plurality of tensor processing templates, wherein:
the plurality of tensor processing templates comprising a vector-vector template, a vector-matrix template, and a matrix-matrix template,
the first layer and the second layer have convolutions with tensors of different shapes,
a tensor processing template for a convolution is to be used to partition an input activation tensor of the convolution into input subtensors and to partition a weight tensor of the convolution into weight subtensors, the input activation tensor including activations, each of the input subtensors being a vector or matrix that includes a subset of the activations of the input activation tensor, the weight tensor including weights, each weight subtensor being a vector or matrix that includes a subset of the weights of the weight tensor,
the processor circuits is to perform the convolution by performing a plurality of operations on the input subtensors and the weight subtensors, and
an operation of the plurality of operations is to be performed on one of the input subtensor and one of the weight subtensors.

14. The method of claim 13, wherein the second one of the plurality of tensor processing templates is different from the first one of the plurality of tensor processing templates.

15. The method of claim 13, further including writing a third set of descriptors to the configuration registers to configure the array of processor circuits to implement a third layer of a convolutional neural network, the third set of descriptors to configure the processor circuits to perform at least one of elementwise operations or maxpool operations.

16. The method of claim 13, wherein the array includes rows and columns, a row includes a first number of processor circuits, a column includes a second number of processor circuits, and the first number equals the second number.

17. An apparatus to implement a convolutional neural network, the apparatus comprising:
an array of processor circuits to perform convolutions having tensors of different shapes; and
means for configuring the array of processor circuits based on a plurality of descriptors to decompose different ones of the convolutions into operations with different tensor processing templates, the different tensor processing templates comprising a vector-vector template, a vector-matrix template, and a matrix-matrix template wherein:
a tensor processing template for a convolution is to be used to partition an input activation tensor of the convolution into input subtensors and to partition a weight tensor of the convolution into weight subtensors, the input activation tensor including activations, each of the input subtensors being a vector or matrix that includes a subset of the activations of the input activation tensor, the weight tensor including weights, each weight subtensor being a vector or matrix that includes a subset of the weights of the weight tensor,
the processor circuits is to perform the convolution by performing a plurality of operations on the input subtensors and the weight subtensors, and
an operation of the plurality of operations is to be performed on one of the input subtensor and one of the weight subtensors.

18. The apparatus of claim 17, wherein the plurality of descriptors comprises a first plurality of descriptors to configure the array of processor circuits to implement a first layer of the convolutional neural network using the tensor processing template, and the means for configuring is to configure the array of processor circuits based on a second plurality of descriptors to implement a second layer of the convolutional neural network using a different tensor processing template.

19. The apparatus of claim 17, further comprising:
a buffer circuit to perform at least one of a truncation operation or a rectified linear unit operation to modify an output of the array of the processor circuits.

20. The apparatus of claim 17, further including means for loading the plurality of descriptors into the means for configuring the array of processor circuits.

21. The apparatus of claim 20, the plurality of descriptors comprises a first plurality of descriptors to configure the array of processor circuits to implement a first layer of the convolutional neural network using the tensor processing template, and the means for loading is to load a second plurality of descriptors into the means for configuring to configure the array of processor circuits to implement a second layer of the convolutional neural network using a different tensor processing template.

22. The apparatus of claim 1, wherein a processor circuit of the array of processor circuits comprises a finite state machine, the finite state machine to control a computation in the processor circuit based on one or more descriptors of the plurality of descriptors.

23. The non-transitory computer readable medium of claim 9, wherein a processor circuit of the array of processor circuits comprises a finite state machine, the finite state machine to control a computation in the processor circuit based on one or more descriptors of the plurality of descriptors.

24. The method of claim 13, wherein a processor circuit of the array of processor circuits comprises a finite state machine, the finite state machine to control a computation in the processor circuit based on one or more descriptors of the plurality of descriptors.

25. The apparatus of claim 17, wherein a processor circuit of the array of processor circuits comprises a finite state machine, the finite state machine to control a computation in the processor circuit based on one or more descriptors of the plurality of descriptors.

* * * * *